US010308763B2

(12) United States Patent
Harth et al.

(10) Patent No.: US 10,308,763 B2
(45) Date of Patent: Jun. 4, 2019

(54) AQUEOUS POLYGLYCIDOL SYNTHESIS WITH ULTRA-LOW BRANCHING

(71) Applicant: Vanderbilt University, Nashville, TN (US)

(72) Inventors: Eva M. Harth, Nashville, TN (US); Benjamin R. Spears, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 0 days.

(21) Appl. No.: 15/684,638

(22) Filed: Aug. 23, 2017

(65) Prior Publication Data

US 2018/0134843 A1 May 17, 2018

Related U.S. Application Data

(63) Continuation of application No. 14/605,602, filed on Jan. 26, 2015, now Pat. No. 9,745,419.

(60) Provisional application No. 61/931,556, filed on Jan. 24, 2014.

(51) Int. Cl.
*C08G 65/34* (2006.01)
*C08G 65/22* (2006.01)
*A61K 47/10* (2017.01)

(52) U.S. Cl.
CPC ............ *C08G 65/34* (2013.01); *C08G 65/22* (2013.01); *C08G 2650/24* (2013.01); *C08G 2650/38* (2013.01); *C08G 2650/56* (2013.01)

(58) Field of Classification Search
CPC ................ C08G 65/34; C08G 2650/24; C08G 2650/38; C08G 2650/56; C08G 65/22
USPC .......................................................... 526/273
See application file for complete search history.

(56) References Cited

U.S. PATENT DOCUMENTS

| | | | |
|---|---|---|---|
| 4,965,342 A | 10/1990 | Vandenberg et al. | |
| 9,161,983 B2 * | 10/2015 | Harth | C08G 65/3326 |
| 9,745,419 B2 | 8/2017 | Harth et al. | |
| 9,757,463 B2 | 9/2017 | Harth et al. | |
| 2011/0262531 A1 | 10/2011 | Pohlmann et al. | |
| 2014/0005278 A1 | 1/2014 | Harth et al. | |
| 2015/0210805 A1 | 7/2015 | Harth et al. | |
| 2016/0206743 A1 | 7/2016 | Harth et al. | |

OTHER PUBLICATIONS

Dworak et al., "Cationic polymerization of glycidol. Polymer structure and polymerization mechanism", (Macromol. Chem. Phys., vol. 196, pp. 1963-1970, (1995)). (Year: 1995).*
U.S. Appl. No. 61/660,675, filed Jun. 15, 2012, Eva M. Harth Vanderbilt.
U.S. Appl. No. 15/663,363, filed Jul. 28, 2017, Eva M. Harth Vanderbilt.
U.S. Appl. No. 61/755,949, filed Jan. 23, 2013, Eva M. Harth Vanderbilt.
U.S. Appl. No. 61/931,556, filed Jan. 24, 2014, Eva M. Harth Vanderbilt.
U.S. Appl. No. 61/822,843, filed May 13, 2013, Eva M. Harth Vanderbilt.
U.S. Appl. No. 61/992,708, filed May 13, 2014, Eva M. Harth Vanderbilt.
Aggarwal, V.K. et al. (1998) (1R,3R)-2-Methylene-1,3-dithiolane 1,3-dioxide: a highly reactive and highly selective chiral ketene equivalent in cycloaddition reactions with a broad range of dienes. J. Chem. Soc., Perkin Trans. 1, 2771-82.
Alconcel, S.N.S. et al. (2011) FDA-approved poly(ehtylene glycol)-protein conjugate drugs. *Polymer Chemistry*, 2(7): 1442-8.
Boyer, C. et al. (2007) Well-defined protein-polymer conjugates via in situ RAFT polymerization. *Journal of the American Chemical Society*, 129(220: 7145-54.
Burakowska, E. et al. (2009) Photoresponsive Crosslinked Hyperbranched Polyglycerols as Smart Nanocarriers for Guest Binding and Controlled Release. *Small*, 15(19): 2199-204.
Calderon, M. et al. (2010) Dendritic Polyglycerols for Biomedical Applications. *Advanced Materials*, 22(2): 190-218.
De, P. et al. (2008) Temperature-regulated activity of responsive polymer-protein conugates prepared by grafting—from via RAFT polymerization. J. Am. Chem. Soc., 130(34)L: 11288-9.
Debaig, C. et al. (2002) Synthesis of linear and cyclic polyglycerols. Polyglyceryled surfactants: synthesis and characterization. *Ocl-Oleagineux Corps Gras Lipides*, 9(2-3): 155-62.
Dworak, A. et al. (1995) Cationic Polymerization of Glycidol—Polymer Structure and polymerization Mechanism. Macromolecular Chemistry and Physics, 196(6): 1963-70.
Dworak et al. (2013)Polyglycidol—How is it Synthesized and What is it Used for? Polimery. 58(9): 641-9.
Eßwein, B. et al. (1996) Anionic polymerization of oxirane in the presence of the polyiminophosphazene base t-Bu-P4. *Macromolecular Rapid Communications*, 17(2): 143-8.
Fischer, W. et al. (2010) Dendritic Polyglycerols with Oligoamine Shells Show Low Toxicity and High siRNA Transfection Efficiency in Vitro. *Bioconjugate Chemistry*, 21(10): 1744-52.
Fitton, A.O. et al. (1987) Synthesis of Simple Oxetanes Carrying Reactive 2-Substituents. *Synthesis—Stuttgart*, 12: 1140-2.
Gervais, M. et al. (2011) Linear High Molar Mass Polyglycidol and its Direct α-Azido Functionalization. Macromolecular Symposia, 308(1): 11.
Gervais, M. et al. (2011) Synthesis of Linear High Molar Mass Glycidol-Based Polymers by Monomer-Activated Anionic Polymerization. *Macromolecules*, 43(4): 1778-84.
Gunasekaran, K. et al. (2011) Conjugation of siRNA with Comb-Type PEG Enhances Serum Stability and Gene Silencing Efficiency. *Macromolecular Rapid Communications*, 32(8): 654-9.

(Continued)

*Primary Examiner* — Ling Siu Choi
*Assistant Examiner* — Ronald Grinsted
(74) *Attorney, Agent, or Firm* — Ballard Spahr LLP

(57) ABSTRACT

Disclosed herein are glycidol-based polymers, nanoparticles, and methods related thereto useful for a variety of applications, including, but not limited to, drug delivery. This abstract is intended as a scanning tool for purposes of searching in the particular art and is not intended to be limiting of the present invention.

19 Claims, 13 Drawing Sheets

(56) References Cited

OTHER PUBLICATIONS

Haag, R. et al. (2000) An approach to glycerol dendrimers and pseudo-dendritic polyglycerols. J. Am. Chem. Soc., 122(12): 2954-5.
Haag, R. et al. (2001) Polymeric nanocapsules based on core-shell0type architectures in hyperbranched polyglycerols. *Abstracts of Papers of the American Chemical Society*. 221:U363-4.
Hamilton, S.K. eta l. (2008) Effective delivery of IgG-antibodies into infected cells via dendritic molecular transporter conjugate IgGMT. *Molecular Biosystems*, 4(12): 1209-11.
Khan, M. et al. (2003) Hyperbranched polyglycidol on Si—SiO2 surfaces via surface-initiated polymerization. Macromolecules, 36(140): 5088-93.
Maminski, M.L. et al. (2011) Fast-curing polyurethane adhesives derived from environmentally friendly hyperbranched polyglycerols—The effect of macromonomer structures. Biomass & Bioenergy, 35(10): 4464-8.
Mendrek, A. et al. (2010) Amphiphilic behaviour of poly(glycidol)-based macromonomers and its influence on homo-polymerisation in water and in water/benzene mixture. *Polymer*, 51(2): 342-54.
Montarnal, D. et al. (2011) Silica-Like Malleable Materials from Permanent Organic Networks. Science, 334: 965-8.
Mugabe, C. et al. (2009) Paclitaxel incorporated in hydrophobically derivatized hyperbranched polyglycerols for intravesical bladder cancer therapy. *Bji International*, 103(7): 978-86.
Mugabe, C. et al. (2011) Development and in vitro characterization of paclitaxel and docetaxel loaded into hydrophobically derivatized hyperbranched polyglycerols. *International Journal of Pharmaceutics*, 404(1-2): 238-49.
Mugabe, C. et al. (2011) In Vitro and In Vivo Evaluation of Intravesical docetaxel Loaded Hydrophobically Derivatized Hyperbranched Polyglycerols in an Orthotopic Model of Bladder Cancer. *Biomacrocolecules*, 12(4): 949-60.
Mugabe, C. et al. (2011) In Vivo Evaluation of Mucoadhesive Nanoparticulate Docetaxel and Paclitaxel Loaded Hydrophobically Derivatized Hyperbranched polyglycerols for Intravesical Bladder Cancer Therapy. European Urology Supplements, 10(2): 166-7.
Pangborn, A.B. (1996) Safe and Convenient Procedure for Solvent Purification. Organometallics, 15: 1518-20.
Parrot, M.G. et al. (2012) Drug Delivery: Relieving PEGylation. Nature Chemistry, 4(1): 13-4.
Petchsuk et al. (2009) Synthesis and Biodegradability of L-lactide/glycidol Copolymers. Poly Degrad Stability. 94(10): 1700-6.
Rangelov, S. et al. (2007) Hydrodynamic behavior of high molar mass linear polyglycidol in dilute aqueous solution. *J Phys Chem B*, 111(38): 11127-33.
Sizovs, A. et al. (2010) Carboydrate Polymers for Nonviral Nucleic Acid Delivery. *Topics in Current Chemistry*, 296(296): 131-90.
Spears, B.R. (2013) Controlled branching of polyglycidol and formation of protein-glycidol bioconjugates via a graft-from approach with "PEG-like" arms. Chem. Commun., 49, 2394-6.
Steinhilber, D. et al. (2011) Hyperbranched polyglycerols on the nanometer and micrometer scale. *Biomaterials*, 32(5): 1311-6.
Sunder, A. et al. (1999) Controlled synthesis of hyperbranched polyglycerols by ring-opening multibranching polymerization. Macromolecules, 32(13): 4240-6.
Sunder, A. et al. (2000) Copolymers of glycidol and glycidyl ethers: Design of branched polyether polyols by combination of latent cyclic AB(2) and ABR monomers. *Macromolecules*, 33(21): 7682-92.
Sunder, A. et al. (2000) Hyperbranched polyglycerols by ring-opening multibranching polymerization. *Macromolecular Symposial*, 153: 187-96.
Tokar, R. et al. (1994) Cationic Polymerization of Glucidol—Coexistence of the Activated Monomer and Active Chain-End Mechanism. Macromolecules, 27(2): 320-2.
Van der Ende, A.E. et al. (2009) Tailored polyester nanoparticles: post-modification with dendritic transporter and targeting units via reductive amination and thiol-ene chemistry. *Soft Matter*, 5(7): 1417-25.
Van der Ende, A.E. et al. (2010) "Click" Reactions: Novel Chemistries for Forming Well-defined Polyester Nanoparticles. *Macromolecules*, 43(13): 5665-71.
Van der Ende, A.E. et al. (2010) Linear release nanoparticle devices for advanced targeted cancer therapies with increased efficacy. *Polymer Chemistry*, 1(1): 93-6.
Van der Ende, A.E. et al. (2008) Approach to formation of multifunctional polyester particles in controlled nanoscopic dimensions. *J. Am.Chem. Soc.*, 130(27): 8706-13.
Wang, S.X. et al. (2008) Growing Hyperbranched Polyglycerols on Magnetic Nanoparticles to Resist Nonspecific Adsorption of Proteins. Colloids and Surfaces B-Biointerfaces. 67(1): 122-6.
Wilms, D. et al. (2009) Advanced control over glycidol polymerization: Hyperbranched polyglycerols via macroinitiators. Abstracts of Papers of the American Chemical Society, 237.
Wilms, D. et al. (2010) Hyperbranched PEG by Random Copolymerization of Ethylene Oxide and Glycidol. Macromolecular Rapid Communications, 31(20): 1811-5.
Wilms, D. et al. (2010) Hyperbranched Polyglycerols: From the Controlled Synthesis of Biocompatible Polyether Polyols to Multipurpose Applications. *Accounts of Chemical Research*, 43(1): 129-41.
Ye, L. et al. (2011) Synthesis and Characterization of Carboxylic Acid Conjugated, Hydrophobically Derivatized, Hyperbranched Polyglycerols as Nanoparticulate Drug Carriers for Cisplatin. *Biomacromoleculesl*, 12(1): 145-55.
Zhang, J.G. et al. (2007) RGD-substituted high molecular weight hyper-branched polyglycerols (HPG) are effective platelet inhibitors. Blood, 110(11): 281A-281A.
Zhang, J.G. et al. (2008) Conjugation to hyperbranched polyglycerols improves RGD-mediated inhibition of platelet function in vitro. *Bioconjugate Chemistry*, 19(6): 1241-7.
Zhang, X.J. et al. (2011) beta-Cyclodextrin grafting hyperbranched polyglycerols as carriers for nasal insulin delivery. *Carbohydrate Polymers*, 84(4): 1419-25.
Zinelaabadine et al. (2012) A Simple and Efficient Green Method for the Deprotection of N-Boc in Various Structurally Diverse Amines under Water-mediated Catalyst-free Conditions, Int. J. Chem. 4(3), pp. 73-9.
Amendment after Notice of Allowance (Rule 312) dated Apr. 25, 2017, by the USPTO for U.S. Appl. No. 14/918,115, filed Oct. 20, 2015 and granted as U.S. Pat. No. 9,757,463 on Sep. 12, 2017 (Inventor—Harth, et al // Applicant—Vanderbilt University) (3 pages).
Final Rejection filed on Nov. 3, 2016 for U.S. Appl. No. 14/605,602, filed Jan. 26, 2015 and published as US 2015-0210805-A1 on Jul. 30, 2015 (Applicant—Vanderbilt University // Inventor—Harth, et al.) (8 pages).
Final Office Action dated Jan. 23, 2015, for U.S. Appl. No. 13/919,916, filed Jun. 17, 2013 and published as US 2014-0005278 A1 on Jan. 2, 2014 (Inventor—Harth, et al // Applicant Vanderbilt University) (15 pages).
Issue Notification filed on Aug. 9, 2017 for U.S. Appl. No. 14/605,602, filed Jan. 26, 2015 and published as US 2015-0210805-A1 on Jul. 30, 2015 (Applicant—Vanderbilt University // Inventor—Harth, et al.) (1 page).
Issue Notification dated Sep. 30, 2015, for U.S. Appl. No. 13/919,916, filed Jun. 17, 2013 and published as US 2014-0005278 A1 on Jan. 2, 2014 (Inventor—Harth, et al // Applicant—Vanderbilt University) (5 pages).
Issue Notification dated Aug. 23, 2017, by the USPTO for U.S. Appl. No. 14/918,115, filed Oct. 20, 2015 and granted as U.S. Pat. No. 9,757,463 on Sep. 12, 2017 (Inventor—Harth, et al // Applicant—Vanderbilt University) (1 page).
Non Final Rejection dated Apr. 8, 2016 for U.S. Appl. No. 14/605,602, filed Jan. 26, 2015 and published as US 2015-0210805-A1 on Jul. 30, 2015 (Applicant—Vanderbilt University // Inventor—Harth, et al.) (10 pages).

(56) References Cited

OTHER PUBLICATIONS

Non Final Rejection dated Nov. 4, 2016, by the USPTO for U.S. Appl. No. 14/918,115, filed Oct. 20, 2015 and granted as U.S. Pat. No. 9,757,463 on Sep. 12, 2017 (Inventor—Harth, et al // Applicant—Vanderbilt University) (10 pages).
Non-Final Office Action dated Sep. 19, 2014, for U.S. Appl. No. 13/919,916, filed Jun. 17, 2013 and published as US 2014-0005278 A1 on Jan. 2, 2014 (Inventor—Harth, et al // Applicant—Vanderbilt University) (7 pages).
Notice of Allowance filed on May 2, 2017 for U.S. Appl. No. 14/605,602, filed Jan. 26, 2015 and published as US 2015-0210805-A1 on Jul. 30, 2015 (Applicant—Vanderbilt University // Inventor—Harth, et al.) (8 pages).
Notice of Allowance dated Jun. 8, 2015, for U.S. Appl. No. 13/919,916, filed Jun. 17, 2013 and published as US 2014-0005278 A1 on Jan. 2, 2014 (Inventor—Harth, et al // Applicant Vanderbilt University) (5 pages).
Notice of Allowance dated Apr. 24, 2017, by the USPTO for U.S. Appl. No. 14/918,115, filed Oct. 20, 2015 and granted as U.S. Pat. No. 9,757,463 on Sep. 12, 2017 (Invento—Harth, et al // Applicant—Vanderbilt University) (7 pages).
Requirement for Restriction or Election dated Jan. 14, 2016 for U.S. Appl. No. 14/605,602, filed Jan. 26, 2015 and published as US 2015-0210805-A1 on Jul. 30, 2015 (Applicant—Vanderbilt Unversity // Inventor—Harth, et al.) (6 pages).
Requirement for Restriction/Election dated Jul. 16, 2014, for U.S. Appl. No. 13/919,916, filed Jun. 17, 2013 and published as US 2014-0005278 A1 on Jan. 2, 2014 (Inventor—Harth, et al // Applicant—Vanderbilt University) (10 pages).
Requirement for Restriction/Election dated Mar. 4, 2014, for U.S. Appl. No. 13/919,916, filed Jun. 17, 2013 and published as US 2014-0005278 A1 on Jan. 2, 2014 (Inventor—Harth, et al // Applicant—Vanderbilt University) (9 pages).
Requirement for Restriction/Election dated Aug. 12, 2016, by the USPTO for U.S. Appl. No. 14/918,115, filed Oct. 20, 2015 and granted as U.S. Pat. No. 9,757,463 on Sep. 12, 2017 (Inventor—Harth, et al // Applicant—Vanderbilt University) (9 pages).
Response to Amendment under (Rule 312) dated May 9, 2017, by the USPTO for U.S. Appl. No. 14/918,115, filed Oct. 20, 2015 and granted as U.S. Pat. No. 9,757,463 on Sep. 12, 2017 (Inventor—Harth, et al // Applicant—Vanderbilt University) (2 pages).
Response to Final Office Action filed on May 26, 2015, for U.S. Appl. No. 13/919,916, filed Jun. 17, 2013 and published as US 2014-0005278 A1 on Jan. 2, 2014 (Inventor—Harth, et al // Applicant—Vanderbilt University) (8 pages).
Response to Final Rejection dated Apr. 24, 2017 for U.S. Appl. No. 14/605,602, filed Jan. 26, 2015 and published as US 2015-0210805-A1 on Jul. 30, 2015 (Applicant—Vanderbilt University // Inventor—Harth, et al.) (7 pages).
Response to Non Final Rejection dated Oct. 10, 2016 for U.S. Appl. No. 14/605,602, filed Jan. 26, 2015 and published as US 2015-0210805-A1 on Jul. 30, 2015 (Applicant—Vanderbilt University // Inventor—Harth, et al.) (10 pages).
Response to Non Final Rejection dated Apr. 4, 2017, to the USPTO for U.S. Appl. No. 14/918,115, filed Oct. 20, 2015 and granted as U.S. Pat. No. 9,757,463 on Sep. 12, 2017 (Inventor—Harth, et al // Applicant—Vanderbilt University) (10 pages).
Response to Non-Final Office Action filed on Dec. 29, 2014, for U.S. Appl. No. 13/919,916, filed Jun. 17, 2013 and published as US 2014-0005278 A1 on Jan. 2, 2014 (Inventor—Harth, et al // Applicant—Vanderbilt University) (21 pages).
Response to Requirement for Restriction or Election and Amendment filed on Mar. 25, 2016 for U.S. Appl. No. 14/605,602, filed Jan. 26, 2015 and published as US 2015-0210805-A1 on Jul. 30, 2015 (Applicant—Vanderbilt University // Inventor—Harth, et al.) (8 pages).
Response to Requirement for Restriction/Election filed on Aug. 6, 2014, for U.S. Appl. No. 13/919,916, filed Jun. 17, 2013 and published as US 2014-0005278 A1 on Jan. 2, 2014 (Inventor—Harth, et al // Applicant—Vanderbilt University) (16 pages).
Response to Requirement for Restriction/Election filed on May 5, 2014, for U.S. Appl. No. 13/919,916, filed Jun. 17, 2013 and published as US 2014-0005278 A1 on Jan. 2, 2014 (Inventor—Harth, et al // Applicant—Vanderbilt University) (15 pages).
Response to Requirement for Restriction/Election dated Oct. 12, 2016, to the USPTO for U.S. Appl. No. 14/918,115, filed Oct. 20, 2015 and granted as U.S. Pat. No. 9,757,463 on Sep. 12, 2017 (Inventor—Harth, et al // Applicant—Vanderbilt University) (13 pages).
Supplemental Response to Final Office Action filed on Jun. 1, 2015, for U.S. Appl. No. 13/919,916, filed Jun. 17, 2013 and published as US 2014-0005278 A1 on Jan. 2, 2014 (Inventor—Harth, et al // Applicant—Vanderbilt University) (6 pages).

* cited by examiner

| Lane | Sample |
| --- | --- |
| 1 | Protein Ladder |
| 2 | BSA |
| 3 | BSA-OH |
| 4 | BSA-ExB-PB |
| 5 | BSA-ExB-DMF |
| 6 | BSA-ExB-DMSO |

AQUEOUS POLYGLYCIDOL SYNTHESIS WITH ULTRA-LOW BRANCHING

CROSS-REFERENCE TO RELATED APPLICATIONS

This application is a continuation of U.S. application Ser. No. 14/605,602, filed on Jan. 26, 2015, which claims the benefit of U.S. Provisional Application No. 61/931,556 filed on Jan. 24, 2014, which applications are incorporated herein by reference in their entireties.

BACKGROUND

Polyglycidols are continuously gaining importance as poly-functional analogs of linear poly(ethylene glycol)s. The ability of hydrogen bonding and derivatization makes these polymers attractive components for gas barrier films, as delivery matrices and fillers in hydrogels materials and for the development of polyglycilated proteins and therapeutics.

Accordingly, disclosed herein are polyglycidols and methods of producing polyglycidols.

SUMMARY OF THE INVENTION

In accordance with the purpose(s) of the invention, as embodied and broadly described herein, the invention, in one aspect, relates to compounds that can be used, for example, in drug delivery, and composition thereof and methods thereof.

Disclosed herein is a method for making a polymer, the method comprising the step of polymerizing glycidol in an aqueous solution, wherein the method makes a polymer that comprises repeating units selected from:

A1

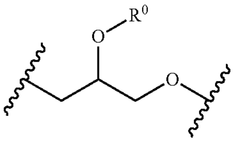

,

A2

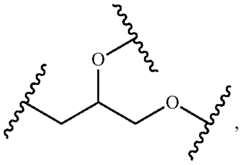

,

B1

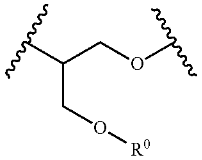

, and

B2

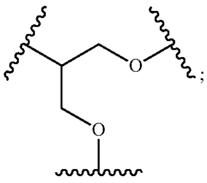

;

wherein $R^0$ is selected from H, alkyl, $NH_2$, and $R^1$;

wherein $R^1$ comprises a crosslinking functionality;

wherein repeating units A1, A2, B1, and B2 account for at least about 50 wgt % of the polymer; and wherein the ratio of (A1+A2):(B1+B2) is greater than 1.

Also disclosed herein, is a polymer made from the method disclosed herein.

Also disclosed herein, is a polymer comprising repeating units selected from

A1

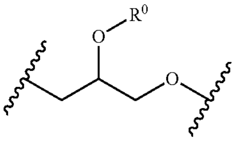

and

A2

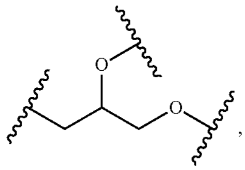

, and repeating units selected from

B1

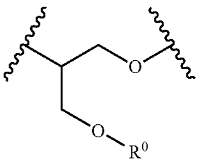

and

B2

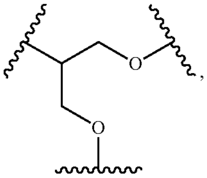

, wherein $R^0$ is selected from H, alkyl, $NH_2$, and $R^1$;

wherein $R^1$ comprises a crosslinking functionality;

wherein repeating units A1, A2, B1, and B2 account for at least about 50 wgt % of the polymer; and wherein the ratio of (A1+A2):(B1+B2) is greater than 1, wherein the polymer does not comprise a

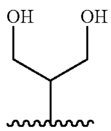

moiety.

Also disclosed herein is a nanoparticle comprising the disclosed polymer.

Also disclosed herein is a method for forming a nanoparticle comprising: a. providing a polymer disclosed herein and crosslinking polymer with crosslinks disclosed herein.

Also disclosed is a drug delivery method comprising the step of administering to a subject a composition comprising a polymer or nanoparticle disclosed herein, in combination with at least one pharmaceutically active agent and/or biologically active agent.

Also disclosed herein is a pharmaceutical composition comprising a polymer or nanoparticle disclosed herein; a pharmaceutically active agent and/or biologically active agent; and a pharmaceutically acceptable carrier.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying Figures, which are incorporated in and constitute a part of this specification, illustrate several aspects and together with the description serve to explain the principles of the invention.

Figure 1:
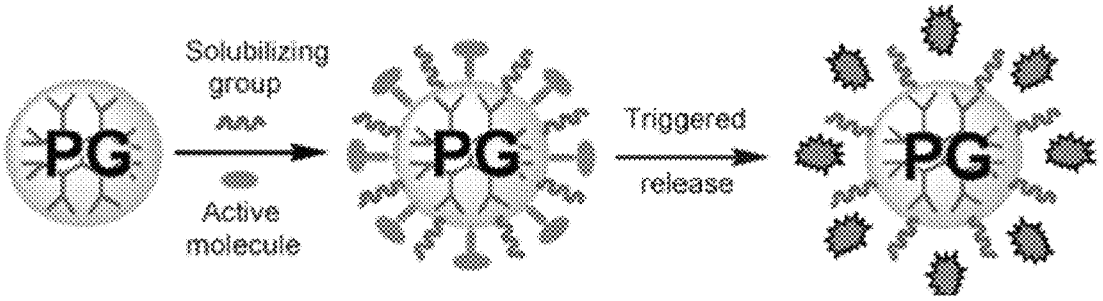
FIG. 1 shows schematic representation of drug-loaded hyperbranched polyglycerol.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

A. Definitions

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

As used herein, the term "analog" refers to a compound having a structure derived from the structure of a parent compound (e.g., a compound disclosed herein) and whose structure is sufficiently similar to those disclosed herein and based upon that similarity, would be expected by one skilled in the art to exhibit the same or similar activities and utilities as the claimed compounds, or to induce, as a precursor, the same or similar activities and utilities as the claimed compounds.

As used herein, the term "subject" refers to the target of administration, e.g., an animal, such as a human. Thus the subject of the herein disclosed methods can be a vertebrate, such as a mammal, a fish, a bird, a reptile, or an amphibian. Alternatively, the subject of the herein disclosed methods can be a human, non-human primate, horse, pig, rabbit, dog, sheep, goat, cow, cat, guinea pig or rodent. The term does not denote a particular age or sex. Thus, adult and newborn subjects, as well as fetuses, whether male or female, are intended to be covered. In one aspect, the subject is a mammal. A patient refers to a subject afflicted with a disease or disorder. The term "patient" includes human and veterinary subjects. In some aspects of the disclosed methods, the subject has been diagnosed with a need for treatment of one or more muscle disorders prior to the administering step. In some aspects of the disclosed method, the subject has been diagnosed with a need for increasing muscle mass prior to the administering step. In some aspects of the disclosed method, the subject has been diagnosed with a need for increasing muscle mass prior to the administering step.

As used herein, the phrase "identified to be in need of treatment for a disorder," or the like, refers to selection of a subject based upon need for treatment of the disorder. For example, a subject can be identified as having a need for treatment of a disorder (e.g., a disorder related to cancer) based upon an earlier diagnosis by a person of skill and thereafter subjected to treatment for the disorder. It is contemplated that the identification can, in one aspect, be performed by a person different from the person making the diagnosis. It is also contemplated, in a further aspect, that the administration can be performed by one who subsequently performed the administration.

As used herein, the terms "administering" and "administration" refer to any method of providing a pharmaceutical preparation to a subject. Such methods are well known to those skilled in the art and include, but are not limited to, oral administration, transdermal administration, administration by inhalation, nasal administration, topical administration, intravaginal administration, ophthalmic administration, intraaural administration, intracerebral administration, rectal administration, sublingual administration, buccal administration, and parenteral administration, including injectable such as intravenous administration, intra-arterial administration, intramuscular administration, and subcutaneous administration. Administration can be continuous or intermittent. In various aspects, a preparation can be administered therapeutically; that is, administered to treat an existing disease or condition. In further various aspects, a preparation can be administered prophylactically; that is, administered for prevention of a disease or condition.

As used herein, the terms "effective amount" and "amount effective" refer to an amount that is sufficient to achieve the desired result or to have an effect on an undesired condition. For example, a "therapeutically effective amount" refers to an amount that is sufficient to achieve the desired therapeutic result or to have an effect on undesired symptoms, but is generally insufficient to cause adverse side effects. The specific therapeutically effective dose level for any particular patient will depend upon a variety of factors including the disorder being treated and the severity of the disorder; the specific composition employed; the age, body weight, general health, sex and diet of the patient; the time of administration; the route of administration; the rate of excretion of the specific compound employed; the duration of the treatment; drugs used in combination or coincidental with the specific compound employed and like factors well known in the medical arts. For example, it is well within the skill of the art to start doses of a compound at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products. In further various aspects, a preparation can be administered in a "prophylactically effective amount"; that is, an amount effective for prevention of a disease or condition.

The term "pharmaceutically acceptable" describes a material that is not biologically or otherwise undesirable, i.e., without causing an unacceptable level of undesirable biological effects or interacting in a deleterious manner.

As used herein, the term "derivative" refers to a compound having a structure derived from the structure of a parent compound (e.g., a compound disclosed herein) and whose structure is sufficiently similar to those disclosed herein and based upon that similarity, would be expected by one skilled in the art to exhibit the same or similar activities and utilities as the claimed compounds, or to induce, as a precursor, the same or similar activities and utilities as the claimed compounds. Exemplary derivatives include salts, esters, amides, salts of esters or amides, and N-oxides of a parent compound.

As used herein, the term "pharmaceutically acceptable carrier" refers to sterile aqueous or nonaqueous solutions, dispersions, suspensions or emulsions, as well as sterile powders for reconstitution into sterile injectable solutions or dispersions just prior to use. Examples of suitable aqueous and nonaqueous carriers, diluents, solvents or vehicles include water, ethanol, polyols (such as glycerol, propylene glycol, polyethylene glycol and the like), carboxymethylcellulose and suitable mixtures thereof, vegetable oils (such as olive oil) and injectable organic esters such as ethyl oleate. Proper fluidity can be maintained, for example, by the use of coating materials such as lecithin, by the maintenance of the required particle size in the case of dispersions and by the use of surfactants. These compositions can also contain adjuvants such as preservatives, wetting agents, emulsifying agents and dispersing agents. Prevention of the action of microorganisms can be ensured by the inclusion of various antibacterial and antifungal agents such as paraben, chlorobutanol, phenol, sorbic acid and the like. It can also be desirable to include isotonic agents such as sugars, sodium chloride and the like. Prolonged absorption of the injectable pharmaceutical form can be brought about by the inclusion of agents, such as aluminum monostearate and gelatin, which delay absorption. Injectable depot forms are made by forming microencapsule matrices of the drug in biodegradable polymers such as polylactide-polyglycolide, poly(orthoesters) and poly(anhydrides). Depending upon the ratio of drug to polymer and the nature of the particular polymer employed, the rate of drug release can be controlled. Depot injectable formulations are also prepared by entrapping the drug in liposomes or microemulsions which are compatible with body tissues. The injectable formulations can be sterilized, for example, by filtration through a bacterial-retaining filter or by incorporating sterilizing agents in the form of sterile solid compositions which can be dissolved or dispersed in sterile water or other sterile injectable media just prior to use. Suitable inert carriers can include sugars such as lactose. Desirably, at least 95% by weight of the particles of the active ingredient have an effective particle size in the range of 0.01 to 10 micrometers.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polymer refers to one or more $—OCH_2CH_2O—$ units in the polymer, regardless of whether ethylene glycol was used to prepare the polymer. Similarly, a sebacic acid residue in a polymer refers to one or more $—CO(CH_2)_8CO—$ moieties in the polymer, regardless of whether the residue is obtained by reacting sebacic acid or an ester thereof to obtain the polymer. In certain aspects, a monomer residue in a polymer can also be described as a repeating unit.

As used herein, the term "biologically active agent" or "bioactive agent" means an agent that is capable of providing a local or systemic biological, physiological, or therapeutic effect in the biological system to which it is applied. For example, the bioactive agent can act to control infection or inflammation, enhance cell growth and tissue regeneration, control tumor growth, act as an analgesic, promote anti-cell attachment, and enhance bone growth, among other functions. Other suitable bioactive agents can include antiviral agents, vaccines, hormones, antibodies (including active antibody fragments sFv, Fv, and Fab fragments), aptamers, peptide mimetics, functional nucleic acids, therapeutic proteins, peptides, or nucleic acids. Other bioactive agents include prodrugs, which are agents that are not biologically active when administered but, upon administration to a subject are converted to bioactive agents through metabolism or some other mechanism. Additionally, any of the compositions of the invention can contain combinations of two or more bioactive agents. It is understood that a biologically active agent can be used in connection with administration to various subjects, for example, to humans (i.e., medical administration) or to animals (i.e., veterinary administration).

As used herein, the term "pharmaceutically active agent" includes a "drug" or a "vaccine" and means a molecule, group of molecules, complex or substance administered to an organism for diagnostic, therapeutic, preventative medical, or veterinary purposes. This term include externally and internally administered topical, localized and systemic human and animal pharmaceuticals, treatments, remedies, nutraceuticals, cosmeceuticals, biologicals, devices, diagnostics and contraceptives, including preparations useful in clinical and veterinary screening, prevention, prophylaxis, healing, wellness, detection, imaging, diagnosis, therapy, surgery, monitoring, cosmetics, prosthetics, forensics and the like. This term may also be used in reference to agriceutical, workplace, military, industrial and environmental therapeutics or remedies comprising selected molecules or selected nucleic acid sequences capable of recognizing cellular receptors, membrane receptors, hormone receptors, therapeutic receptors, microbes, viruses or selected targets comprising or capable of contacting plants, animals and/or humans. This term can also specifically include nucleic acids and compounds comprising nucleic acids that produce a bioactive effect, for example deoxyribonucleic acid (DNA) or ribonucleic acid (RNA). Pharmaceutically active agents include the herein disclosed categories and specific examples. It is not intended that the category be limited by the specific examples. Those of ordinary skill in the art will recognize also numerous other compounds that fall within the categories and that are useful according to the invention. Examples include a radiosensitizer, the combination of a radiosensitizer and a chemotherapeutic, a steroid, a xanthine, a beta-2-agonist bronchodilator, an anti-inflammatory agent, an analgesic agent, a calcium antagonist, an angiotensin-converting enzyme inhibitors, a beta-blocker, a centrally active alpha-agonist, an alpha-1-antagonist, carbonic anhydrase inhibitors, prostaglandin analogs, a combination of an alpha agonist and a beta blocker, a combination of a carbonic anhydrase inhibitor and a beta blocker, an anticholinergic/antispasmodic agent, a vasopressin analogue, an antiarrhythmic agent, an antiparkinsonian agent, an antiangina/antihypertensive agent, an anticoagulant agent, an antiplatelet agent, a sedative, an ansiolytic agent, a peptidic agent, a biopolymeric agent, an antineoplastic agent, a laxative, an antidiarrheal agent, an antimicrobial agent, an antifungal agent, or a vaccine. In a further aspect, the pharmaceutically active agent can be coumarin, albumin, bromolidine, steroids such as betamethasone, dexamethasone, methylprednisolone, prednisolone, prednisone, triamcinolone, budesonide, hydrocortisone, and pharmaceutically acceptable hydrocortisone derivatives; xanthines such as theophylline and doxophylline; beta-2-agonist bronchodilators such as salbutamol, fenterol, clenbuterol, bambuterol, salmeterol, fenoterol; antiinflammatory agents, including antiasthmatic anti-inflammatory agents, antiarthritis antiinflammatory agents, and non-steroidal antiinflammatory agents, examples of which include but are not limited to sulfides, mesalamine, budesonide, salazopyrin, diclofenac, pharmaceutically acceptable diclofenac salts, nimesulide, naproxene, acetominophen, ibuprofen, ketoprofen and piroxicam; analgesic agents such as salicylates; calcium channel blockers such as nifedipine, amlodipine, and nicardipine; angiotensin-converting enzyme inhibitors such as captopril, benazepril hydrochloride, fosinopril sodium, trandolapril, ramipril, lisinopril, enalapril, quinapril hydrochloride, and moexipril hydrochloride; beta-blockers (i.e., beta adrenergic blocking agents) such as sotalol hydrochloride, timolol maleate, timol hemihydrate, levobunolol hydrochloride, esmolol hydrochloride, carteolol, propanolol hydrochloride, betaxolol hydrochloride, penbutolol sulfate, metoprolol tartrate, metoprolol succinate, acebutolol hydrochloride, atenolol, pindolol, and bisoprolol fumarate; centrally active alpha-2-agonists (i.e., alpha adrenergic receptor agonist) such as clonidine, brimonidine tartrate, and apraclonidine hydrochloride; alpha-1-antagonists such as doxazosin and prazosin; anticholinergic/antispasmodic agents such as dicyclomine hydrochloride, scopolamine hydrobromide, glycopyrrolate, clidinium bromide, flavoxate, and oxybutynin; vasopressin analogues such as vasopressin and desmopressin; prostaglandin analogs such as latanoprost, travoprost, and bimatoprost; cholinergics (i.e., acetylcholine receptor agonists) such as pilocarpine hydrochloride and carbachol; glutamate receptor agonists such as the N-methyl D-aspartate receptor agonist memantine; anti-Vascular endothelial growth factor (VEGF) aptamers such as pegaptanib; anti-VEGF antibodies (including but not limited to anti-VEGF-A antibodies) such as ranibizumab and bevacizumab; carbonic anhydrase inhibitors such as methazolamide, brinzolamide, dorzolamide hydrochloride, and acetazolamide; antiarrhythmic agents such as quinidine, lidocaine, tocainide hydrochloride, mexiletine hydrochloride, digoxin, verapamil hydrochloride, propafenone hydrochloride, flecaimide acetate, procainamide hydrochloride, moricizine hydrochloride, and diisopyramide phosphate; antiparkinsonian agents, such as dopamine, L-Dopa/Carbidopa, selegiline, dihydroergocryptine, pergolide, lisuride, apomorphine, and bromocryptine; antiangina agents and antihypertensive agents such as isosorbide mononitrate, isosorbide dinitrate, propranolol, atenolol and verapamil; anticoagulant and antiplatelet agents such as coumadin, warfarin, acetylsalicylic acid, and ticlopidine; sedatives such as benzodiazapines and barbiturates; ansiolytic agents such as lorazepam, bromazepam, and diazepam; peptidic and biopolymeric agents such as calcitonin, leuprolide and other LHRH agonists, hirudin, cyclosporin, insulin, somatostatin, protirelin, interferon, desmopressin, somatotropin, thymopentin, pidotimod, erythropoietin, interleukins, melatonin, granulocyte/macrophage-CSF, and heparin; antineoplastic agents such as etoposide, etoposide phosphate, cyclophosphamide, methotrexate, 5-fluorouracil, vincristine, doxorubicin, cisplatin, hydroxyurea, leucovorin calcium, tamoxifen, flutamide, asparaginase, altretamine, mitotane, and procarbazine hydrochloride; laxatives such as senna concentrate, casanthranol, bisacodyl, and sodium picosulphate; antidiarrheal agents such as difenoxine hydrochloride, loperamide hydrochloride, furazolidone, diphenoxylate hydrochloride, and microorganisms; vaccines such as bacterial and viral vaccines; antimicrobial agents such as penicillins, cephalosporins, and macrolides, antifungal agents such as imidazolic and triazolic derivatives; and nucleic acids such as DNA sequences encoding for biological proteins, and antisense oligonucleotides. It is understood that a pharmaceutically active agent can be used in connection with administration to various subjects, for example, to humans (i.e., medical administration) or to animals (i.e., veterinary administration).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. It is also contemplated that, in certain aspects, unless expressly indicated to the contrary, individual substituents can be further optionally substituted (i.e., further substituted or unsubstituted).

In defining various terms, "$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The terms "amine" or "amino" as used herein are represented by the formula—$NA^1A^2$, where $A^1$ and $A^2$ can be, independently, hydrogen or alkyl, cycloalkyl, alkenyl, cycloalkenyl, alkynyl, cycloalkynyl, aryl, or heteroaryl group as described herein.

The term "ester" as used herein is represented by the formula—$OC(O)A^1$ or—$C(O)OA^1$, where $A^1$ can be alkyl, cycloalkyl, alkenyl, cycloalkenyl, alkynyl, cycloalkynyl, aryl, or heteroaryl group as described herein. The term "polter" as used herein is represented by the formula $-(A^1O(O)C-A^2-C(O)O)_a$— or $-(A^1O(O)C-A^2-OC(O))_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer from 1 to 500. "Polter" is as the term used to describe a group that is produced by the reaction between a compound having at least two carboxylic acid groups with a compound having at least two hydroxyl groups.

The term "ether" as used herein is represented by the formula $A^1OA^2$, where $A^1$ and $A^2$ can be, independently, an alkyl, cycloalkyl, alkenyl, cycloalkenyl, alkynyl, cycloalkynyl, aryl, or heteroaryl group described herein. The term "polyether" as used herein is represented by the formula $-(A^1O-A^2O)_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "azide" as used herein is represented by the formula —$N_3$.

The term "thiol" as used herein is represented by the formula —SH.

The terms "hydrolysable group" and "hydrolysable moiety" refer to a functional group capable of undergoing hydrolysis, e.g., under basic or acidic conditions. Examples of hydrolysable residues include, without limitatation, acid halides, activated carboxylic acids, and various protecting groups known in the art (see, for example, "Protective Groups in Organic Synthesis," T. W. Greene, P. G. M. Wuts, Wiley-Interscience, 1999).

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Polymers

In the past, hyperbranched polyglycidols received attention as possible drug delivery systems in line with dendrimer materials investigated for the same purpose. The synthesis of hyperbranched materials have been mostly conducted through anionic polymerization procedures under stringent water-free conditions, whereas cationic polymerizations are also employed but to a lesser extent. In general, polymerization mechanisms with free, unprotected glycidols give hyperbranched materials with a degree of branching (DB) of around 0.6 and higher. As reported by Frey et al., the degree of branching can be reduced to a very limited extent by copolymerization with monomers that have no ability to branch. It is surprising that also by addition of up to nearly 50% of the non-glycidol monomer the branching cannot be reduced significantly and is non-linear towards the addition of the co-monomer. Prior to the current disclosure, pure homo polyglycidols with a branching of around 0.18-0.3 could not be accomplished by any other methodology.

The recent interest in finding alternative hydrophilic polymers to increase the availability of materials that promote an increased bioavailability of proteins or provide an abundance of hydrogen bonds led to the investigation of ways to control the degree of branching within polyglycidol structures. Published U.S. Application 2014/0005278 to Harth et al. discloses that the branching of polyglycidols can be controlled kinetically by using temperatures ranging from 40° C. to −20° C. and by using a tin catalyst, such as, for example, $Sn(OTf)_2$ as a catalyst. The catalyst is suspended in THF, which results in that some THF copolymerizes with the polyglycidol. Such copolymerized THF is not extending more than 10% of the polymer content.

As disclosed herein, protein conjugates can be prepared in buffer alone without using a catalyst. Also, as disclosed herein, homopolymerization of glycidol in buffer alone is achievable in a variety of different temperatures, pH, and concentrations of the glycidol in buffer.

As briefly described herein, the present invention, in various aspects, relates to glycidol-based polymer systems and methods related thereto. In a one aspect, as shown below, glycidol is an analog of ethylene glycol and to polyvinyl alcohol. In further aspects, glycidol can be ring opened in different ways, is capable of controlled polymerization, and is inherently hydrophilic due to the presence of a primary hydroxyl functionality. In one aspect, the glycidol polymers can be semi-branched.

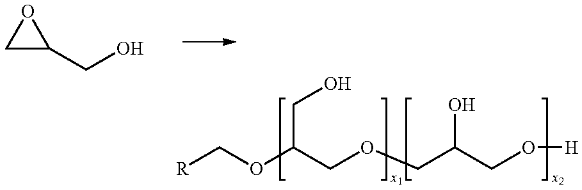

In a further aspect, the semi-branched architectures can be used for transportation of drugs and other biological cargo, as shown in FIG. 1. However, this type of structure presents a number of limitations. For example, the vastly branched systems have limited post-modification, as they only contain an assortment of primary and secondary hydroxyl groups, rather than an assortment of reactive points. In a still further aspect, the random configurations can lead to complications with introducing the intended cargo to the system.

In further aspects, the glycidol based polymer systems comprise linear glycidols. In one aspect, linear glycidols can be accomplished using glycidol derivatives and anionic polymerization methods, as represented by the reaction scheme below.

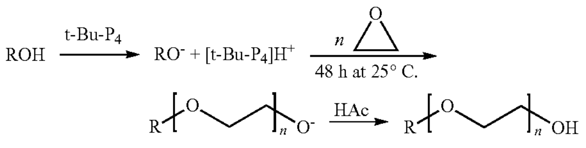

However, this method involves rigorous reaction conditions, is very susceptible to oxygen, and requires numerous purification steps. In a further aspect, this method does not deliver polymer systems with a suitable degradation profile. In a further aspect, the inherent water solubility of poly (glycidol) systems can be utilized to allow a method that will provide more linear poly(glycidol) systems.

In a further aspect, the linear glycidols comprise additional functional group containing co-monomers. In a still further aspect, the additional functional groups can be subsequently cross-linked to form nanoparticle structures. These nanoparticles will imbibe the applicability of the water-soluble glycidol units with the functionality of groups, such as allyl's and epoxides, which are capable of a range of post-modification reactions. In a still further aspect, the addition of this increased functionality provides a variety of nanoparticles that can be tailored to specific needs, as well as structures whose functionality can be verified in a laboratory setting.

Figure 2:
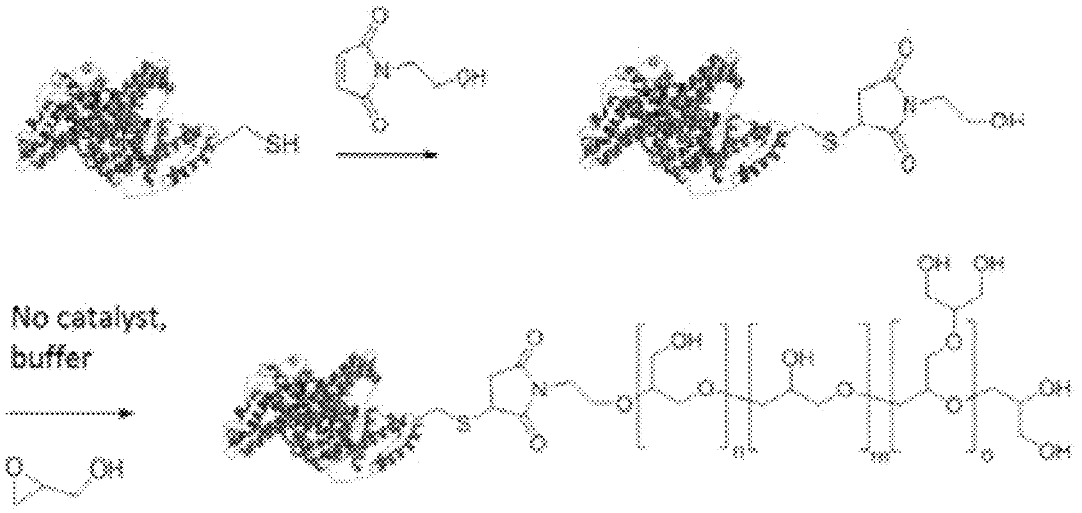
FIG. 2 shows a schematic representation of a poly(glycidol)-protein conjugate and its synthetic route.

In a further aspect, the polyglycidols disclosed herein can be covalently linked to a macromolecular structure. The macromolecular structure can be a hydrophobic. In one aspect, the macromolecular structure can be biological structure, such as, for example, a protein or an antibody. In another aspect, the macromolecular structure can be a therapeutic (i.e. drug or pharmaceutical). The therapeutic can be a biological therapeutic, such as, for example, a protein or an antibody. FIG. 2 shows an example of a polyglycidol, as disclosed herein, covalently linked to a macromolecular structure (protein). As shown in FIG. 2 the polyglycidol is synthesized in a buffer without the use of a catalyst.

As described above, glycidol's analogous structure to polyethylene glycol, as well as its abundance of primary and secondary hydroxyl groups provides a system that is relatively non-toxic and exceedingly hydrophilic.

In various aspects. the polymer systems formed from the methods disclosed herein can have use in numerous applications ranging from potential vaccine models and selective drug delivery vehicles (Zhang, X. J., et al., Carbohydrate Polymers, 2011. 84(4): p. 1419-1425; Mugabe, C., et al., Int. J. Pharma., 2011. 404(1-2): p. 238-249; Mugabe, C., et al., European Urology Supplements, 2011. 10(2): p. 166-167; Mugabe, C., et al., Bju International, 2009. 103(7): p. 978-986; Mugabe, C., et al., Biomacromolecules, 2011. 12(4): p. 949-960), to biomineralization control and soluble catalyst supports in organic synthesis. In a further aspect, much of the success seen in these applications relates to the inherent characteristics of the polyglycerol's branched structure. In a still further aspect, limiting the degree of branching (DB), preferably with lower PDI's, can be beneficial in the formation of new, and possibly more robust, poly(glycidol) architectures and functionalized building blocks.

In some aspects, glycidol based polymers, much like polyethylene glycol (PEG), have severely slow degradation profiles. While not a significant problem for low molecular weight species, large macromolecular hyperbranched systems cannot be easily eliminated from the body. Therefore, lower branched polyglycidol, such as semi-branched polyglycidol, can potentially be more easily eliminated from the body.

In various further aspects, the present polyglycidol polymer systems can be useful in the solubilization of proteins and siRNA, which investigations had thus far been dominated by polyacrylates having PEG side chains (Alconcel, et al., Polymer Chemistry, 2011. 2(7): p. 1442-1448; Gunasekaran, K., et al., Macromolecular Rapid Communications, 2011. 32(8): p. 654-659).

In further aspects, poly(glycidol) can be used as a method of increasing the solubility of biological structures, as depicted in FIG. 2. In a still further aspect, the ability to control the degree of branching present will be integral to the efficacy of the synthesized structures and will allow for a more tailored approach to solubilization of biological structures. In a yet further aspect, facilitated by the increased degradability, the glycidol based copolymers can be both more effective and less harmful than their PEG counterparts.

In one aspect, the polymers can comprise desirable structural features and can provide new polymers with customizable degrees of branching, high functionality, increased solubility, and tunable biodegradability, thus imbuing all the benefits of polyglycerols to systems that are more tailored for delivery of a range of drugs and biological cargo. In an even further aspect, the chemical characteristics of the synthesized polymers were investigated through both $^{1}H$ NMR and $^{13}C$NMR techniques, and are further described in the Examples.

Figure 6:
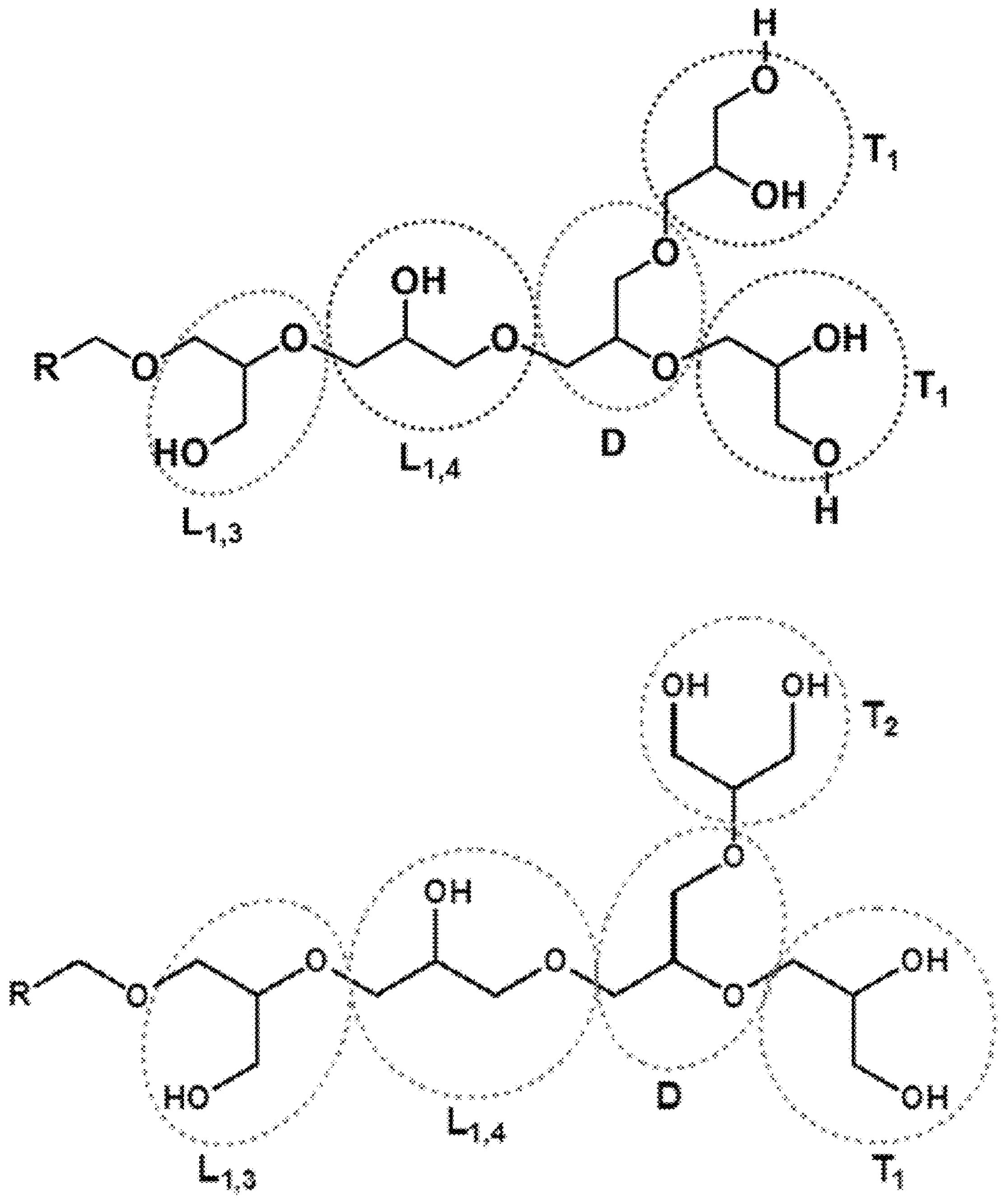
FIG. 6 shows a visual representation of poly(glycidol) branching possibilities.

The branching possibilities of polyglycidol can be dependent on the synthetic method. For example, polyglycidol that is polymerized in an aqueous solution (without a catalyst), such as a buffer, as described herein, contains $L_{1,3}$, $L_{1,4}$, D, and $T_1$ branching, as shown in FIG. 6 (top). Polyglycidol that is polymerized using a catalyst, such as a tin catalyst, contains $L_{1,3}$, $L_{1,4}$, D, $T_1$, and $T_2$ branching, as shown in FIG. 6 (bottom). Thus, polyglycidol that is polymerized using a tin catalyst has a $T_2$ moiety, while a polyglycidol that is polymerized in buffer without a catalyst does not contain a $T_2$ moiety. In one aspect, the polymer disclosed herein does not comprise a $T_2$ moiety. The $T_2$ moiety is a terminal moiety of the polymer. As shown in FIG. 6 (bottom), $T_2$ can be represented as a

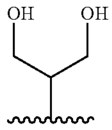

moiety. As shown in FIG. 6 (top and bottom), $T_1$ can be represented as a

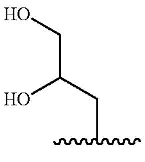

moiety. In one aspect, the polymer disclosed herein comprises a

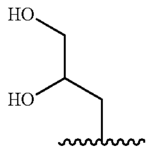 [SMILES: *CC(O)CO]

moiety. The $T_1$ moiety is a terminal moiety of the polymer.

The linear $L_{1,4}$ repeating unit, denoted as A1 herein, is generated in a much higher abundance using the method disclosed herein, that it polymerization in an aqueous solution, such as a buffer, in contrast to the polymers in the prior art. For example, the method disclosed in published U.S. Application 2014/0005278 to Harth et al. produces a higher abundance of $L_{1,3}$, which also leads to a higher branching because the primary alcohol is more reactive than the secondary alcohol in the $L_{1,4}$ repeating unit. Accordingly, the mechanism of polymerization is different depending on the method. The method disclosed herein provides for a polymer with lower branching.

Disclosed herein is a polymer comprising repeating units selected from:

A1

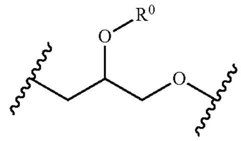

,

A2

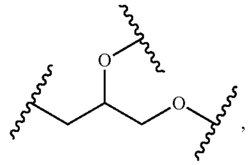

,

B1

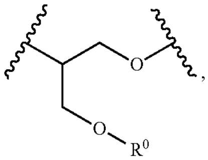

, and

B2

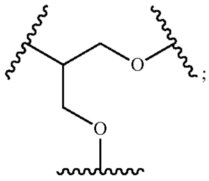

;

wherein $R^0$ is selected from H, alkyl, $NH_2$, and $R^1$; wherein $R^1$ comprises a crosslinking functionality; wherein repeating units A1, A2, B1, and B2 account for at least about 50 wgt % of the polymer; and wherein the ratio of (A1+A2):(B1+B2) is greater than 1.

In one aspect, the polymer comprises repeating units selected from

A1

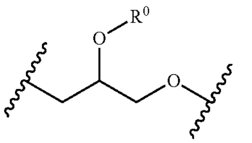

and

A2

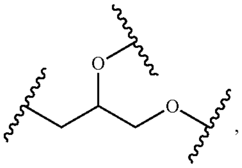

, and repeating units selected from

B1

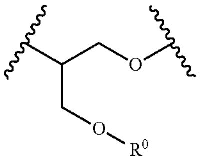

and

B2

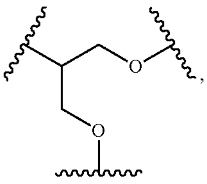

, wherein $R^0$ is selected from H, alkyl, $NH_2$, and $R^1$; wherein $R^1$ comprises a crosslinking functionality; wherein repeating units A1, A2, B1, and B2 account for at least about 50 wgt % of the polymer; and wherein the ratio of (A1+A2):(B1+B2) is greater than 1.

Also disclosed herein is a polymer consisting of repeating units selected from

A1

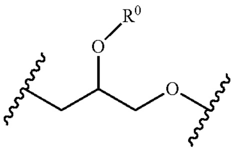

and

A2

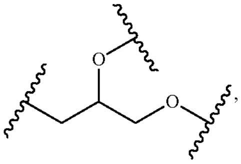

, and repeating units selected from

B1

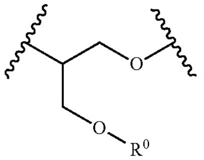

and

B2

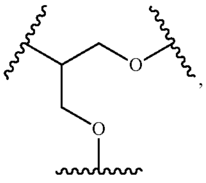

, wherein $R^0$ is selected from H, alkyl, $NH_2$, and $R^1$;
wherein $R^1$ comprises a crosslinking functionality; and
wherein the ratio of (A1+A2):(B1+B2) is greater than 1.

In one aspect, the polymer comprises repeating units selected from

A1

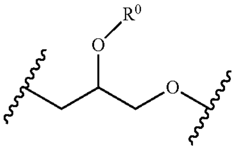

and

A2

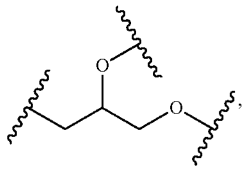

, and repeating units selected from

B1

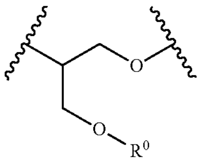

and

B2

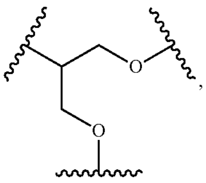

, wherein $R^0$ is selected from H, alkyl, $NH_2$, and $R^1$; wherein $R^1$ comprises a crosslinking functionality; wherein repeating units A1, A2, B1, and B2 account for at least about 50 wgt % of the polymer; and wherein the ratio of (A1+A2):(B1+B2) is greater than 1, wherein the polymer does not comprise a

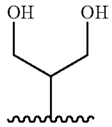

moiety. Also disclosed herein is a polymer consisting of repeating units selected from

A1

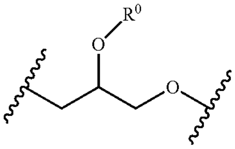

and

A2

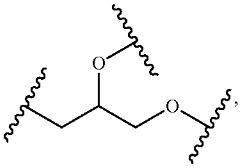

and repeating units selected from

B1

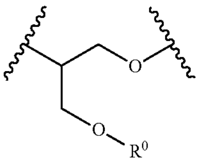

and

B2

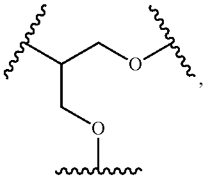

at least one repeating unit formed from a monomer selected from:

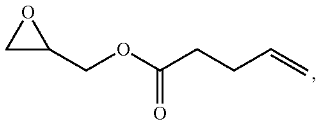

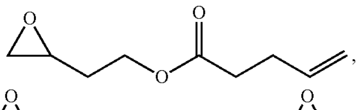

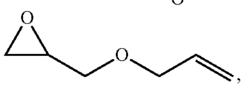

and

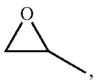

or a combination thereof, wherein $R^0$ is selected from H, alkyl, $NH_2$, and $R^1$;

wherein $R^1$ comprises a crosslinking functionality; and wherein the ratio of (A1+A2):(B1+B2) is greater than 1.

In one aspect, the polymer comprises from 0 wgt % to 20 wgt % of a repeating unit formed from tetrahydrofuran. In another aspect, the polymer comprises from 0 wgt % to 10 wgt % of a repeating unit formed from tetrahydrofuran. In yet another aspect, the polymer comprises from 0 wgt % to 5 wgt % of a repeating unit formed from tetrahydrofuran. In yet another aspect, the polymer comprises from 0 wgt % to 1 wgt % of a repeating unit formed from tetrahydrofuran. In yet another aspect, the polymer comprises from 0 wgt % to 0.5 wgt % of a repeating unit formed from tetrahydrofuran. In yet another aspect, the polymer comprises from 0 wgt % to 0.1 wgt % of a repeating unit formed from tetrahydrofuran.

Also disclosed herein is a polymer made from any one of the methods disclosed herein.

In one aspect, the polymer is a pure homopolymer formed from glycidol monomers.

In one aspect, the polymer does not comprise a unit or repeating unit formed from diglycidyl ether.

In one aspect, the polymer does not comprise an initiator, other than glycidol, such as for example, an isoamylacohol initiator.

In one aspect, the polymer disclosed herein has a degree of branching (DB) from about 0.10 to about 0.30. In another aspect, the polymer disclosed herein has a degree of branching (DB) from about 0.15 to about 0.30. In yet another aspect, the polymer disclosed herein has a degree of branching (DB) from about 0.20 to about 0.30.

In one aspect, the polymer does not comprise a unit or repeating unit formed from tetrahydrofuran (THF). In one aspect, the polymer does not essentially comprise a unit or repeating unit formed from tetrahydrofuran (THF).

In one aspect, the polymer does not comprise a metal catalyst residue, such as, for example, a tin catalyst residue, such as, for example, $Sn(OTf)_2$.

In one aspect, the polymer disclosed herein consists of repeating units selected from A1, A2, B1, and B2. In is understood that a polymer consisting of repeating units selected from A1, A2, B1, and B2 also includes terminal groups at the end of the polymer, as is understood in the art. For example, a terminal group for the polymers described herein can be an epoxide, —OH, or —H. In another example, the terminal group for the polymers described herein can be a $T_1$ moiety as disclosed herein.

In one aspect, the polymer disclosed herein consists essentially of repeating units selected from A1, A2, B1, and B2. A polymer that consists essentially of repeating units selected from A1, A2, B1, and B2, is a polymer without other additional repeating units not being A1, A2, B1, or B2. In is understood that a polymer that consists essentially of repeating units selected from A1, A2, B1, and B2 also includes terminal groups at the end of the polymer, as is understood in the art. For example, a terminal group for the polymers described herein can be an epoxide, —OH, or —H. In another example, the terminal group for the polymers described herein can be a $T_1$ moiety as disclosed herein.

In one aspect, the ratio of (A1+A2):(B1+B2) is from about 1.5 to about 10.0. In another aspect, the ratio of (A1+A2):(B1+B2) is from about 2.5 to about 10.0. In yet another aspect, the ratio of (A1+A2):(B1+B2) is from about 3.5 to about 10.0. In yet another aspect, the ratio of (A1+A2):(B1+B2) is from about 2.3 to about 7.1. In yet another aspect, the ratio of (A1+A2):(B1+B2) is from about 2.3 to about 5.4. In yet another aspect, the ratio of (A1+A2):(B1+B2) is from about 2.0 to about 5.0. In yet another aspect, the ratio of (A1+A2):(B1+B2) is from about 2.2 to about 5.1. In yet another aspect, the ratio of (A1+A2):(B1+B2) is from about 2.5 to about 5.9. In yet another aspect, the ratio of (A1+A2):(B1+B2) is from about 2.6 to about 6.1. In yet another aspect, the ratio of (A1+A2):(B1+B2) is from about 2.6 to about 7.4. In yet another aspect, the ratio of (A1+A2):(B1+B2) is from about 2.8 to about 8.6. In yet another aspect, the ratio of (A1+A2):(B1+B2) is from about 1.7 to about 4.9. In yet another aspect, the ratio of (A1+A2):(B1+B2) is from about 2.1 to about 5.5. In yet another aspect, the ratio of (A1+A2):(B1+B2) is from about 2.2 to about 5.6. In yet another aspect, the ratio of (A1+A2):(B1+B2) is from about 2.2 to about 4.75.

In one aspect, repeating units A1; A2; B1; and B2 account for at least about 50 wgt % of the polymer. In another aspect, repeating units A1; A2; B1; and B2 account for at least about 60 wgt % of the polymer. In yet another aspect, repeating units A1; A2; B1; and B2 account for at least about 60 wgt % of the polymer. In yet another aspect, repeating units A1; A2; B1; and B2 account for at least about 70 wgt % of the polymer. In yet another aspect, repeating units A1; A2; B1; and B2 account for at least about 80 wgt % of the polymer. In yet another aspect, repeating units A1; A2; B1; and B2 account for at least about 90 wgt % of the polymer. In yet another aspect, repeating units A1; A2; B1; and B2 account for at least about 95 wgt % of the polymer. In yet another aspect, repeating units A1; A2; B1; and B2 account for at least about 99 wgt % of the polymer. In yet another aspect, repeating units A1; A2; B1; and B2 account for about 100 wgt % of the polymer. In yet another aspect, repeating units A1; A2; B1; and B2 account for 100 wgt % of the polymer.

In one aspect, the polymer is covalently bonded to a macromolecular structure, such as, for example, a biological agent, such as, for example a therapeutically agent.

In one aspect, the polymer is covalently bonded to a biologic agent, such as a protein, DNA, RNA, or SiRNA, for example, a protein. Such system can enhance the solubility of the biologic agent.

In one aspect, the polymer comprises at least one repeating unit formed from a monomer selected from:

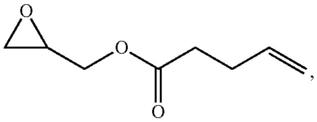,

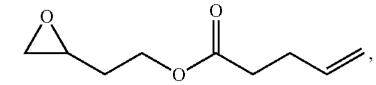,

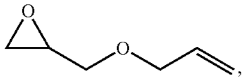, and 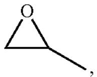, or a combination thereof,

In one aspect, the polymer comprises at least one repeating unit from a monomer selected from:

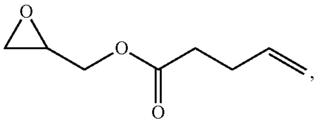,

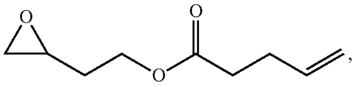, and

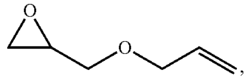, or a combination thereof,

It is understood that the polymer can be oxidized to form repeating units comprising epoxides or alkynes. It is also understood that all or only a portion of the repeating units are oxidized in the polymer. Thus, it is understood that the resultant polymer can comprise repeating units comprising alkenes and repeating units comprising epoxides and/or alkynes. For example, the polymer can comprise at least 1%, 5%, 10%, 15%, 20%, or 25% repeating units that have been oxidized. Thus, in one aspect, the polymer comprises repeating units comprising pendent groups selected from

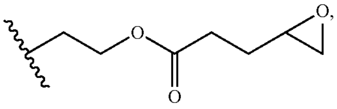,

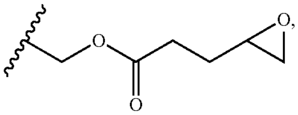, 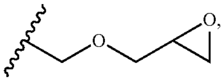,

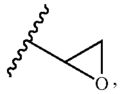, 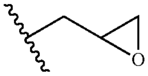,

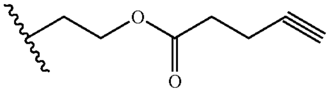,

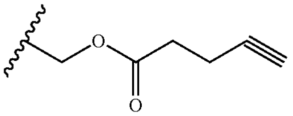, 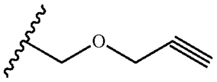,

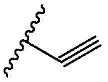, and 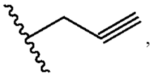, or a combination thereof.

In one aspect, the polymer further comprises a repeating unit formed from

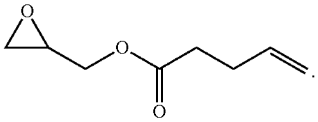.

In another aspect, the polymer further comprises a repeating unit formed from

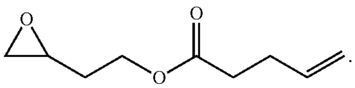.

In yet another aspect, the polymer further comprises a repeating unit formed from

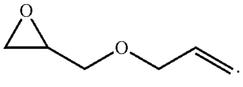.

In yet another aspect, the polymer further comprises a repeating unit formed from

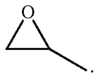

In yet another aspect, the polymer further comprises a

In one aspect, the polymer further comprises crosslinks, wherein the crosslinks comprise

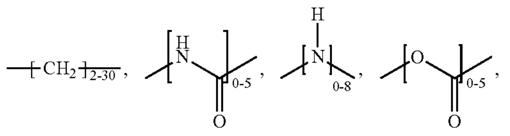

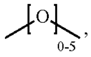 and 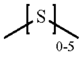

wherein at least one of

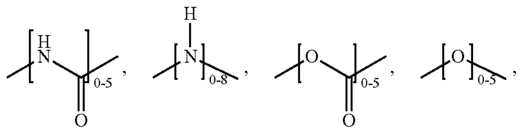 and

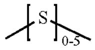

is not 0.

The crosslinks binds two or more polymers together. The polymers can be any polymer disclosed herein. The crosslinks can comprise one or more, such as two, moieties that can react with one or more of the disclosed polymers thereby linking the polymers together. Thus, suitable moieties include those that can react with alkenes, epoxides, or alkynes. Non-limiting moieties include —SH, —$NH_2$, and

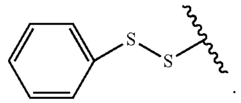 [SMILES: *SSc1ccccc1]

The resultant polymer will then comprise one or more bonds which is a result from these reactions. For example, the polymer can comprise —S— and —NH— bonds. It is also understood that these reactions will reduce the alkenes, alkynes, or epoxides that participates in the reactions.

In one aspect, the polymer comprises

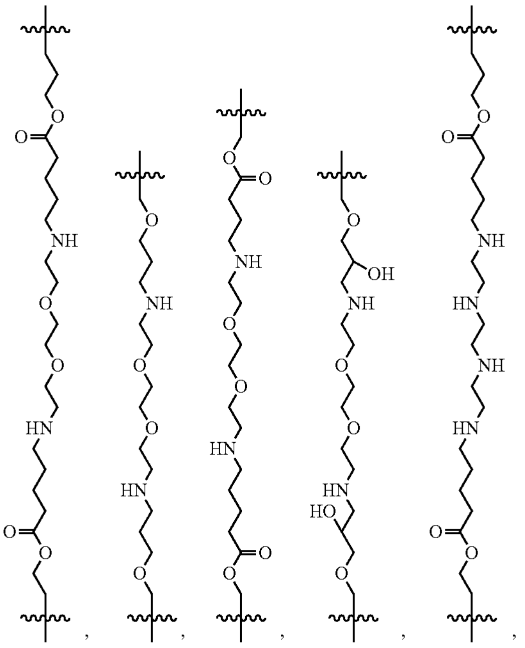

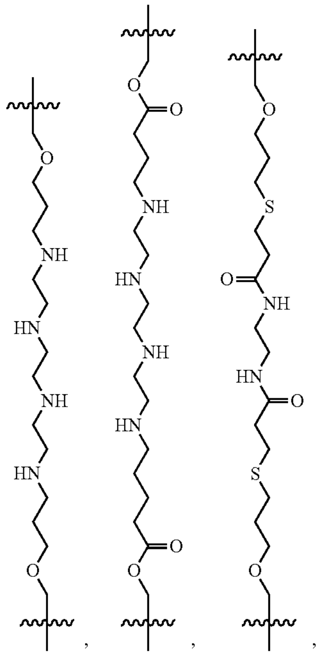

-continued

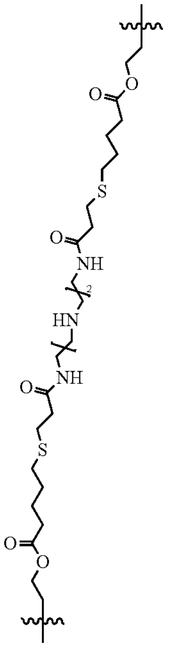
,
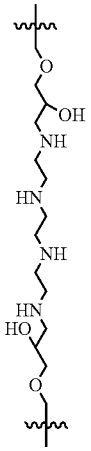
,
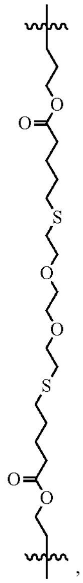
,
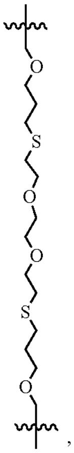
,

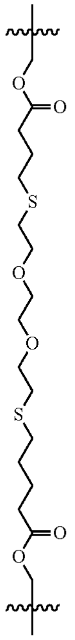
, or
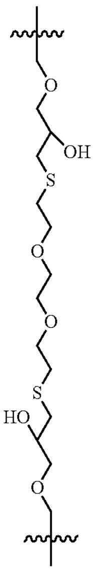
.

Accordingly, the polymer can comprise the structure

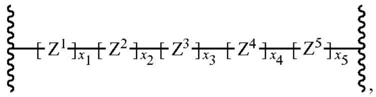
, wherein $Z^1$ is

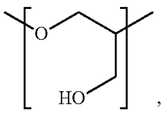
,
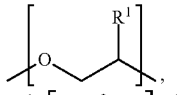
,
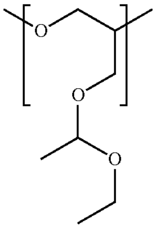
, or
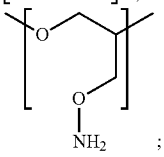
;

wherein $Z^2$ is

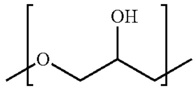
, or
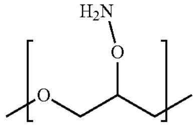
;

wherein $Z^3$ is

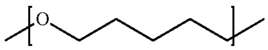
;

wherein $Z^4$ is

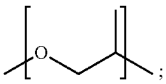
;

wherein $Z^5$ is

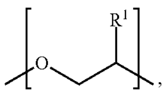
,
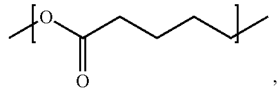
,
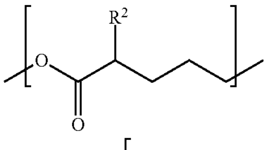
,
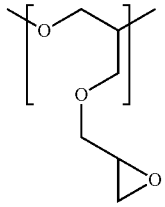
, or
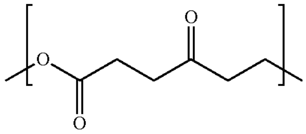
, or a combination thereof;

wherein, simultaneously, $X_1$ is from greater than 0% to 90%, $X_2$ is from 0% to 95%, $X_3$ is from 0% to 90%, $X_4$ is from 0% to 90%, and $X_5$ is from greater than 0% to 90%, provided that $X_1+X_2+X_3+X_4+X_5$ equals 100%; and wherein each $R^1$ independently comprises a crosslinking functionality In one aspect, the crosslinking functionality comprises an allyl, epoxide, amine, thiol, azide, or alkyne functionality. In one aspect, the crosslinking functionality comprises an allyl functionality. In another aspect, the crosslinking functionality comprises an epoxide. In yet another aspect, the crosslinking functionality comprises an amine functionality. In yet another aspect, the crosslinking functionality comprises a thiol functionality. In yet another aspect, the crosslinking functionality comprises an azide functionality. In yet another aspect, the crosslinking functionality comprises an alkyne functionality.

In one aspect, polymer has the structure selected from the group consisting of

-continued

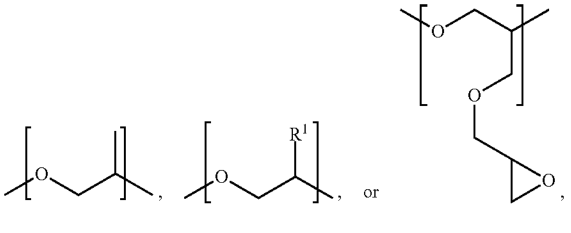

or or a combination thereof.

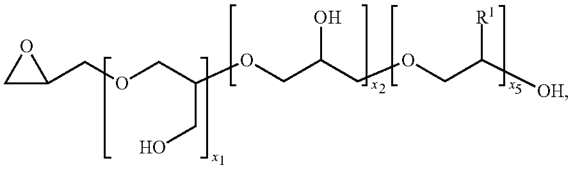

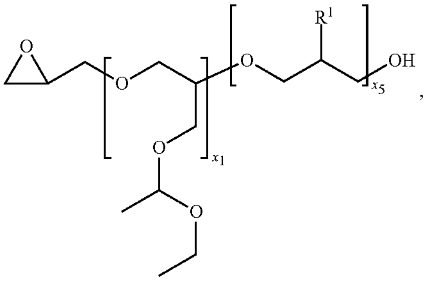

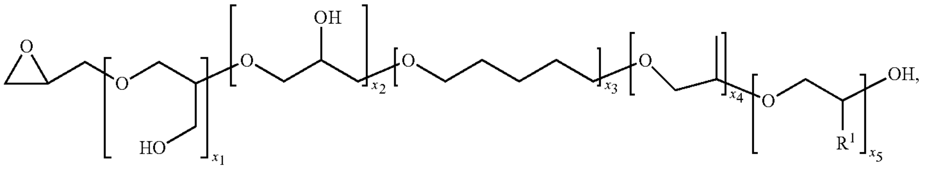

and

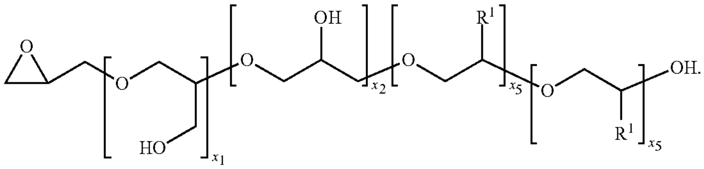

In one aspect, the polymer can comprise one or more of repeating units selected from:

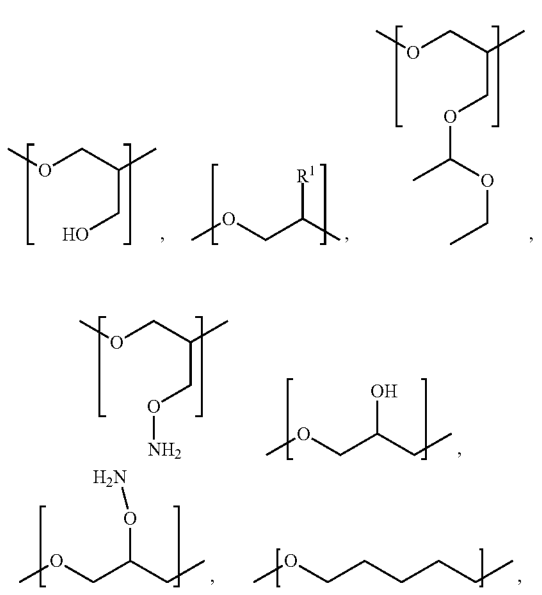

In another aspect, the polymer can comprise the structure

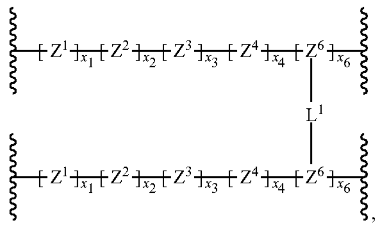

wherein each $Z^1$ independently is

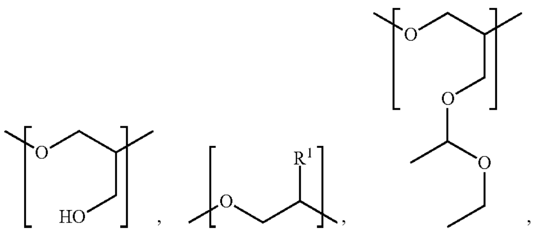

or

-continued

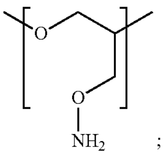

;

wherein each $Z^2$ independently is

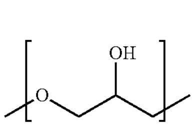

, or

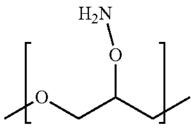

;

wherein $Z^3$ is

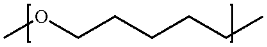

;

wherein $Z^4$ is

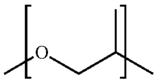

;

wherein each $Z^6$ independently comprises

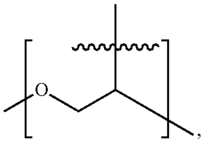

, and optionally independently comprises, or

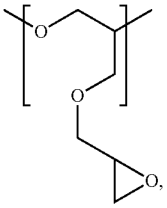

or a combination thereof; wherein, simultaneously, $X_1$ is from greater than 0% to 90%, $X_2$ is from 0% to 95%, $X_3$ is from 0% to 90%, $X_4$ is from 0% to 90%, and $X_6$ is from greater than 0% to 90%, provided that $X_1+X_2+X_3+X_4+X_6$ equals 100%; wherein each $R^1$ independently comprises a crosslinking functionality; and wherein $L^1$ comprises $-(CH_2)_{2-30}-$,

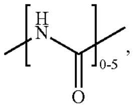

,

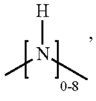

,

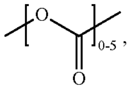

,

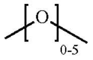

, and

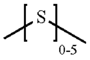

wherein least one of

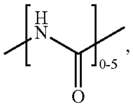

,

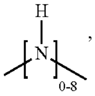

,

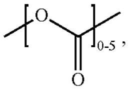

,

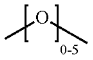

, and

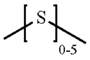

is not 0.

In one aspect, the compound comprises the structure

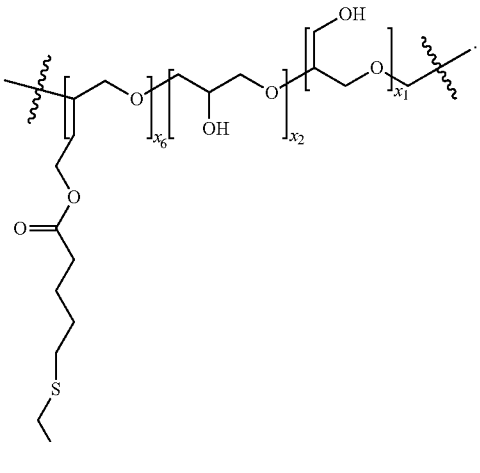

.

-continued

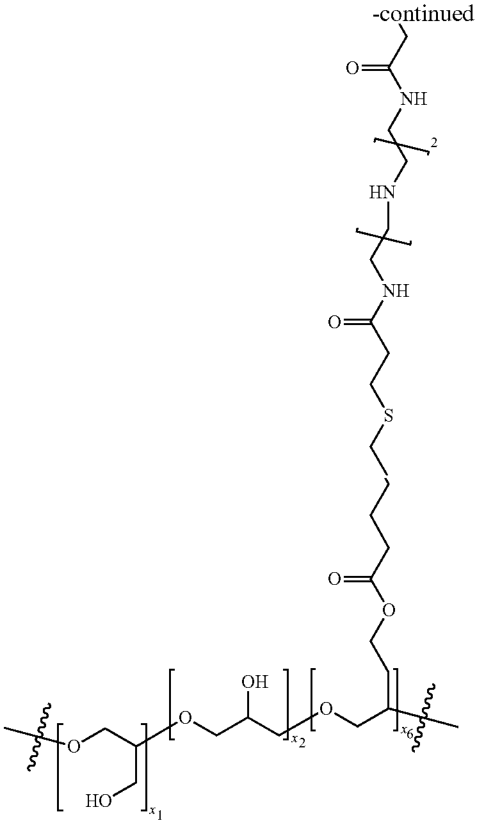

In one aspect, the polymer is a macroscopic network.

In one aspect, the polymer is biodegradable.

In one aspect, the polymer has a weight average molecular weight from 0.3 kDa to 40 kDa. In another aspect, the polymer has a weight average molecular weight from 0.3 kDa to 30 kDa. In another aspect, the polymer has a weight average molecular weight from 0.3 kDa to 20 kDa. In another aspect, the polymer has a weight average molecular weight from 0.3 kDa to 15 kDa. In another aspect, the polymer has a weight average molecular weight from 1 kDa to 10 kDa. In yet another aspect, the polymer has a weight average molecular weight from 1 kDa to 15 kDa. In yet another aspect, the polymer has a weight average molecular weight from 1 kDa to 10 kDa. In yet another aspect, the polymer has a weight average molecular weight from 1 kDa to 75 kDa. In yet another aspect, the polymer has a weight average molecular weight from 1 kDa to 50 kDa. In yet another aspect, the polymer has a weight average molecular weight from 1 kDa to 25 kDa. In yet another aspect, the polymer has a weight average molecular weight of at least 5 kDa. In yet another aspect, the polymer has a weight average molecular weight of at least 50 kDa.

In one aspect, the polymer has a PDI from 1.01 to 5.0. In another aspect, the polymer has a PDI from 1.01 to 4.0. In yet another aspect, the polymer has a PDI from 1.01 to 3.0. In yet another aspect, the polymer has a PDI from 1.01 to 2.0. In yet another aspect, the polymer has a PDI from 1.01 to 1.5. In yet another aspect, the polymer has a PDI from 1.01 to 1.25. In yet another aspect, the polymer has a PDI from 1.15 to 1.40. In yet another aspect, the polymer has a PDI from 1.01 to 1.10.

a. X Groups

In one aspect, $X_1+X_2$ equals from 50% to 99%. In another aspect, $X_1+X_2$ equals from 60% to 95%. In yet another aspect, $X_1+X_2$ equals from 70% to 90%.

In one aspect, $X_1+X_2+X_3+X_4$ equals from 50% to 99%. In another aspect, $X_1+X_2+X_3+X_4$ equals from 60% to 95%. In yet another aspect $X_1+X_2+X_3+X_4$ equals from 70% to 90%.

In one aspect, $X_5$ is from 1% to 40%. In another aspect, $X_5$ is from 5% to 35%. In yet another aspect, $X_5$ is from 10% to 30%.

In one aspect, $X_2$, $X_3$, and $X_4$ are 0%. In another aspect, $X_2$ is greater than 0% to 90% and $X_3$, and $X_4$ are 0%. In yet another aspect, $X_2$, $X_3$, and $X_4$ are from greater than 0% to 90%.

In one aspect, each of $X_1$, $X_2$, $X_3$, $X_4$, and $X_5$ independently are 1 to 1000. In one aspect, each of $X_1$, $X_2$, and $X_5$ independently are 1 to 1000. In one aspect, each of $X_1$ and $X_5$ independently are 1 to 1000. In another aspect, each of $X_1$, $X_2$, $X_3$, $X_4$, and $X_5$ independently are 1 to 500. In yet another aspect, each of $X_1$, $X_2$, $X_3$, $X_4$, and $X_5$ independently are 1 to 300. In yet another aspect, each of $X_1$, $X_2$, $X_3$, $X_4$, and $X_5$ independently are 1 to 100. In yet another aspect, each of $X_1$, $X_2$, $X_3$, $X_4$, and $X_5$ independently are 1 to 50. In yet another aspect, each of $X_1$, $X_2$, $X_3$, $X_4$, and $X_5$ independently are 1 to 25. In another aspect, each of $X_1$, $X_2$ and $X_5$ independently are 1 to 500. In yet another aspect, each of $X_1$, $X_2$, and $X_5$ independently are 1 to 300. In yet another aspect, each of $X_1$, $X_2$, and $X_5$ independently are 1 to 100. In yet another aspect, each of $X_1$, $X_2$, and $X_5$ independently are 1 to 50. In yet another aspect, each of $X_1$, $X_2$, and $X_5$ independently are 1 to 25. In another aspect, each of $X_1$ and $X_5$ independently are 1 to 500. In yet another aspect, each of $X_1$ and $X_5$ independently are 1 to 300. In yet another aspect, each of $X_1$ and $X_5$ independently are 1 to 100. In yet another aspect, each of $X_1$ and $X_5$ independently are 1 to 50. In yet another aspect, each of $X_1$ and $X_5$ independently are 1 to 25.

In one aspect, each of $X_1$, $X_2$, $X_3$, $X_4$, and $X_6$ independently are 1 to 1000. In one aspect, each of $X_1$, $X_2$, and $X_6$ independently are 1 to 1000. In one aspect, each of $X_1$ and $X_6$ independently are 1 to 1000. In another aspect, each of $X_1$, $X_2$, $X_3$, $X_4$, and $X_6$ independently are 1 to 500. In yet another aspect, each of $X_1$, $X_2$, $X_3$, $X_4$, and $X_6$ independently are 1 to 300. In yet another aspect, each of $X_1$, $X_2$, $X_3$, $X_4$, and $X_6$ independently are 1 to 100. In yet another aspect, each of $X_1$, $X_2$, $X_3$, $X_4$, and $X_6$ independently are 1 to 50. In yet another aspect, each of $X_1$, $X_2$, $X_3$, $X_4$, and $X_6$ independently are 1 to 25. In another aspect, each of $X_1$, $X_2$ and $X_6$ independently are 1 to 500. In yet another aspect, each of $X_1$, $X_2$ and $X_6$ independently are 1 to 300. In yet another aspect, each of $X_1$, $X_2$ and $X_6$ independently are 1 to 100. In yet another aspect, each of $X_1$, $X_2$, and $X_6$ independently are 1 to 50. In yet another aspect, each of $X_1$, $X_2$, and $X_6$ independently are 1 to 25. In another aspect, each of $X_1$ and $X_6$ independently are 1 to 500. In yet another aspect, each of $X_1$ and $X_6$ independently are 1 to 300. In yet another aspect, each of $X_1$ and $X_6$ independently are 1 to 100. In yet another aspect, each of $X_1$ and $X_6$ independently are 1 to 50. In yet another aspect, each of $X_1$ and $X_6$ independently are 1 to 25.

In one aspect, each of $x_7$, $x_8$, $x_9$, and $x_{10}$ independently are 1 to 1000. In another aspect, each of $x_7$, $x_8$, $x_9$, and $x_{10}$ independently are 1 to 500. In yet another aspect, each of $x_7$, $x_8$, $x_9$, and $x_{10}$ independently are 1 to 300. In yet another aspect, each of $x_7$, $x_8$, $x_9$, and $x_{10}$ independently are 1 to 100. In yet another aspect, each of $x_7$, $x_8$, $x_9$, and $x_{10}$ independently are 1 to 50. In yet another aspect, each of $x_7$, $x_8$, $x_9$, and $x_{10}$ independently are 1 to 25.

b. Z Groups

It is understood that the Z groups represent a repeating unit in a polymer. It is understood that the arrangement of Z groups in the polymers disclosed herein can be in any order, for example, $Z^1$, $Z^2$, $Z^3$, $Z^4$, and $Z^5$ can be in any order. Thus, it is also understood that the polymer can be a random copolymer, whereby the order of each repeat unit of $Z^1$, $Z^2$, $Z^3$, $Z^4$, and $Z^5$ is random.

In one aspect, $Z^1$ is

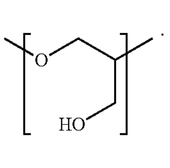

In another aspect, $Z^1$ is

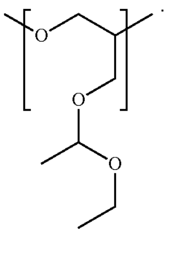

In yet another aspect, $Z^1$ is

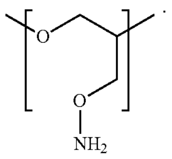

In yet another aspect, $Z^1$ is

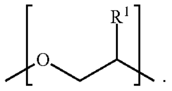

In one aspect, $Z^2$ is

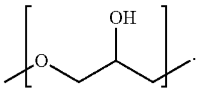

In another aspect, $Z^2$ is

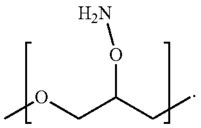

In one aspect, $Z^5$ is

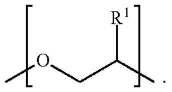

In yet another aspect, $Z^5$ is

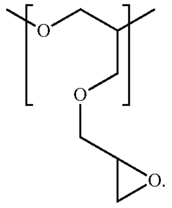

In yet another aspect, $Z^5$ is

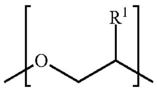

and

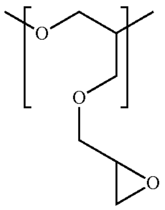

.

In one aspect, each $Z^6$ comprises

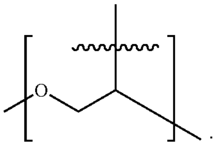

In another aspect, each $Z^6$ comprises

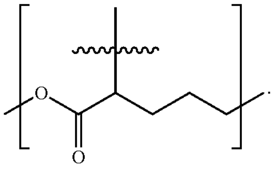

In one aspect, $Z^{11}$ is

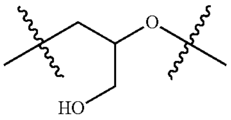

or

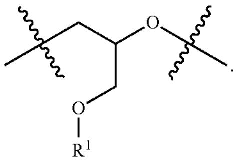

In one aspect, $Z^{12}$ is

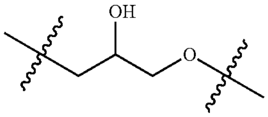

or

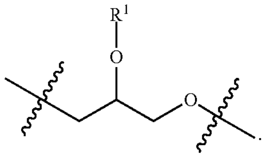

c. R Groups

In one aspect, $R^0$ is H. In another aspect, $R^0$ is alkyl. In yet another aspect, $R^0$ is $NH_2$. In yet another aspect, $R^0$ is $R^1$.

In one aspect, each of $R^1$ and $R^2$ independently comprises

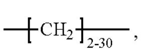,
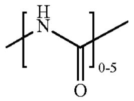,
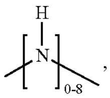,
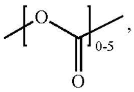,
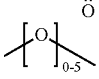, and
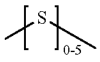

wherein at least one of

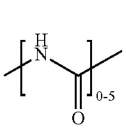,
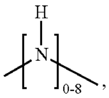,
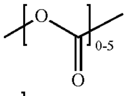,
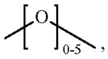, and
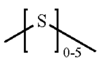

is not 0.

In one aspect, $R^1$ comprises

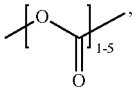

for example, $R^1$ can comprise

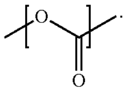

In one aspect, $R^1$ comprises

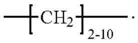

In another aspect, $R^1$ comprises

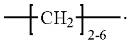

In one aspect, $R^1$ comprises

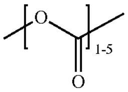

and

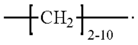

In yet another aspect, $R^1$ comprises

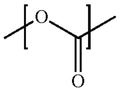

and

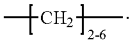

In yet another aspect, $R^1$ comprises

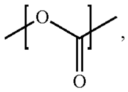,
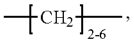, and an allyl functionality.

In one aspect, $R^2$ comprises

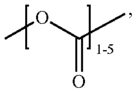

for example, $R^2$ can comprise

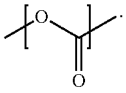

In one aspect, $R^2$ comprises $$-\!\left[CH_2\right]_{2\text{-}10}\!-.$$

In another aspect, $R^2$ comprises $$-\!\left[CH_2\right]_{2\text{-}6}\!-.$$

In one aspect, $R^2$ comprises

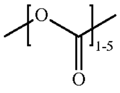 and $-\!\left[CH_2\right]_{2\text{-}10}\!-.$

In yet another aspect, $R^2$ comprises

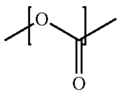 and $-\!\left[CH_2\right]_{2\text{-}6}\!-$ .

In yet another aspect, $R^1$ comprises

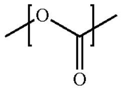, $-\!\left[CH_2\right]_{2\text{-}6}\!-,$ and an allyl functionality.

In one aspect, the each of $R^1$ and $R^2$ independently are selected from the group consisting of

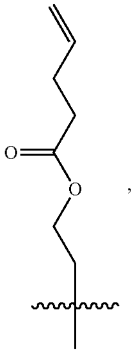, 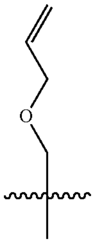, 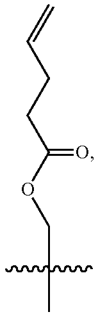

-continued

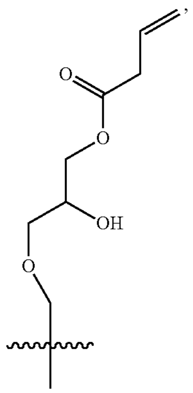 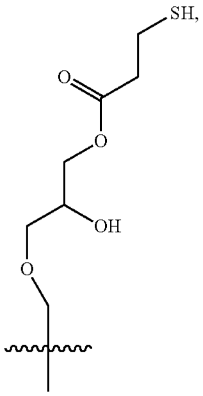

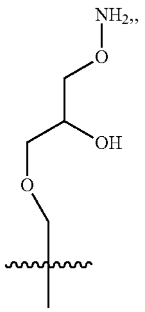 or 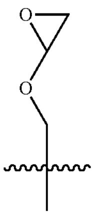 .

In one aspect, $R^1$ is

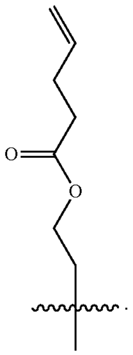 [SMILES: *CCOC(=O)CCC=C]

In another aspect, $R^1$ is

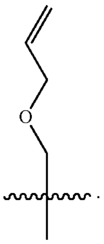

In yet another aspect, $R^1$ is
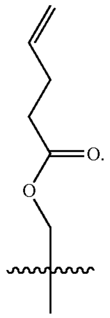 [SMILES: *COC(=O)CCC=C]
In yet another aspect, $R^1$ is
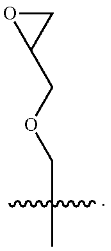 [SMILES: *COCC1CO1]
In yet another aspect, $R^1$ is
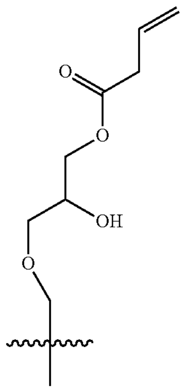
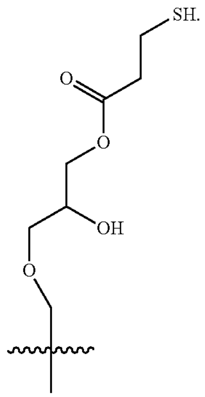
In yet another aspect, $R^1$ is
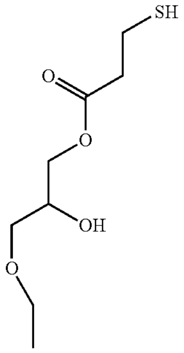
In yet another aspect, $R^1$ is
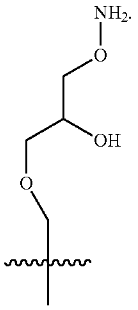 [SMILES: *COCC(O)CON]
In yet another aspect, $R^1$ is
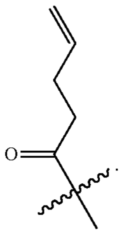 [SMILES: *C(=O)CCC=C]
In yet another aspect, $R^1$ is
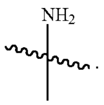
In yet another aspect, $R^1$ is
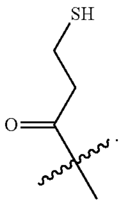 [SMILES: *C(=O)CCS]
In yet another aspect, $R^1$ is
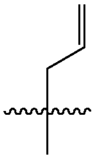 [SMILES: *CC=C]

In one aspect, $R^2$ is

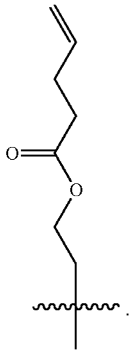

In another aspect, $R^2$ is

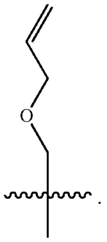 [SMILES: *COCC=C]

In yet another aspect, $R^2$ is

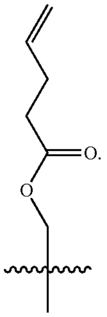 [SMILES: *COC(=O)CCC=C]

In yet another aspect, $R^2$ is

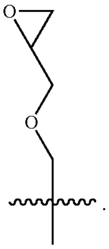 [SMILES: *COCC1CO1]

d. Crosslinks and L Groups

In one aspect, crosslinks or $L^1$ comprises $-(CH_2)_{2-30}-$, 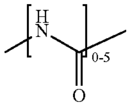, 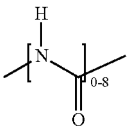,

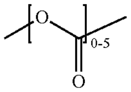, 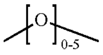, and 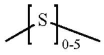

wherein least one of

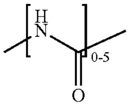, 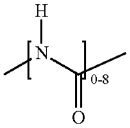, 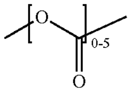,

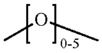, and 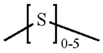

is not 0.

In one aspect, crosslinks or $L^1$ comprises at least

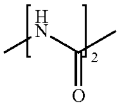 and $-(CH_2)_{2-30}-$.

In one aspect, $L^1$ comprises at least

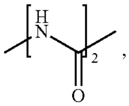, 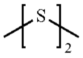, and $-(CH_2)_{2-30}-$.

In one aspect, crosslinks or $L^1$ comprises one or more of

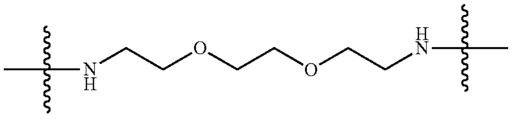,

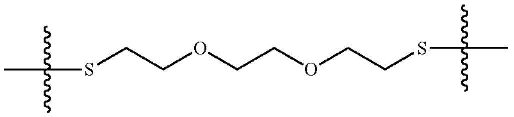,

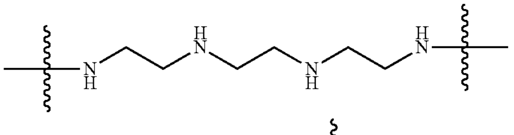,

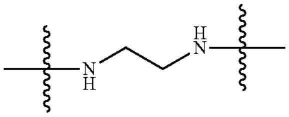, or

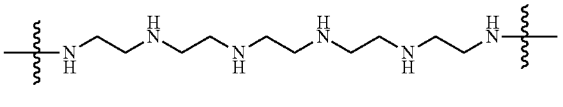, or any combination thereof.

In one aspect, crosslinks or $L^1$ comprises one or more of

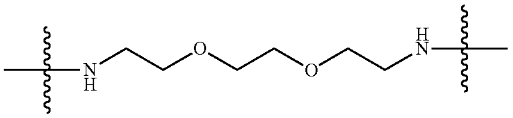.

In another aspect, crosslinks or $L^1$ comprises one or more of

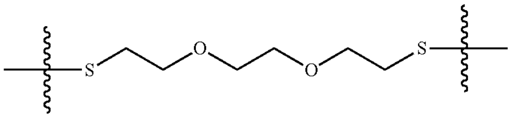.

In yet another aspect, crosslinks or $L^1$ comprises one or more of

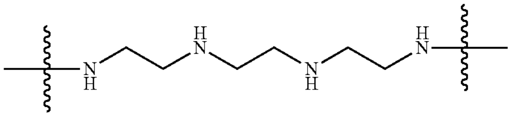.

In yet another aspect, crosslinks or $L^1$ comprises one or more of

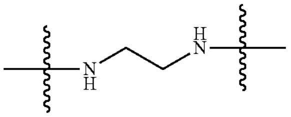.

In yet another aspect, crosslinks or $L^1$ comprises one or more of

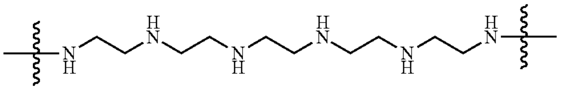.

In one aspect, $L^1$ comprises one or more of

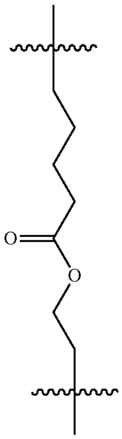, 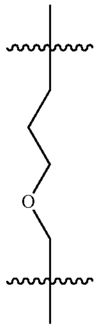, 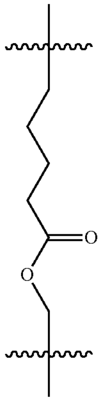, or

-continued

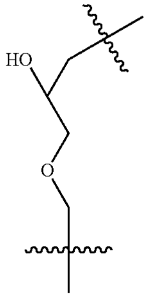,

, or any combination thereof.

In one aspect, $L^1$ is

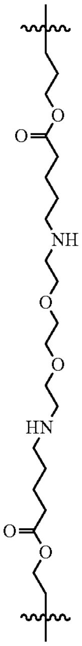, 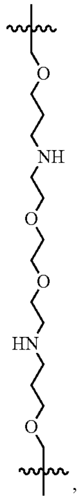, 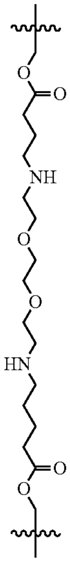, 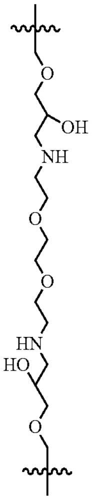, 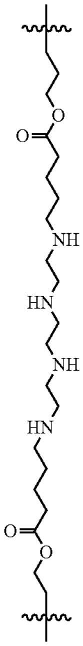,

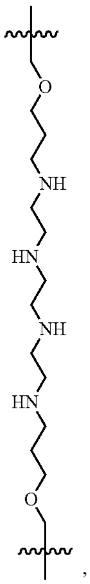, 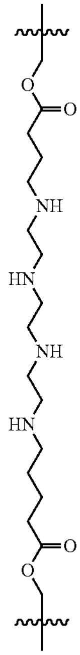, 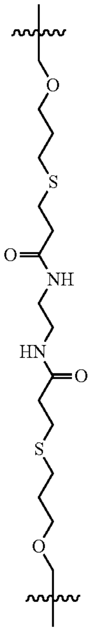,

-continued

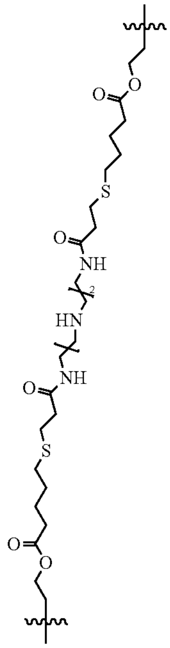

,

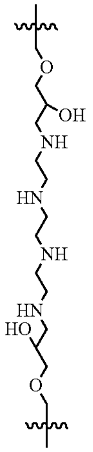

,

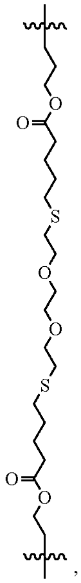

,

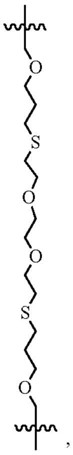

,

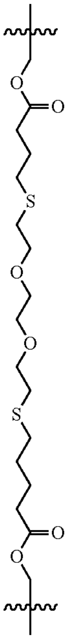

, or

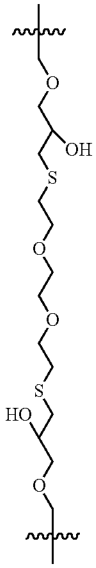

.

In one aspect, $L^2$ comprises

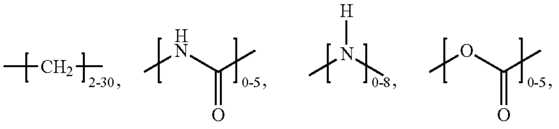

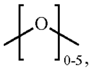

and

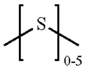

wherein at least one of

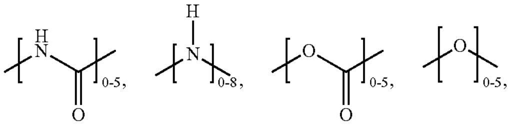

and

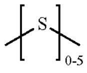

is not 0.

In one aspect, $L^2$ comprises at least

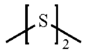

and

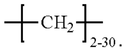

In one aspect, $L^2$ comprises at least

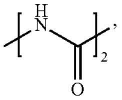

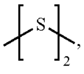

and

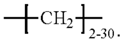

In one aspect, $L^2$ comprises

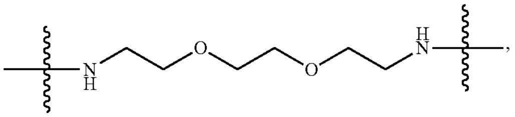

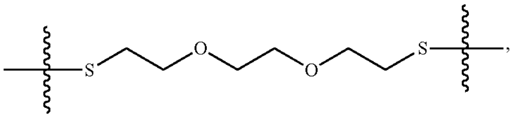

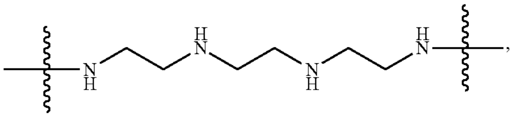

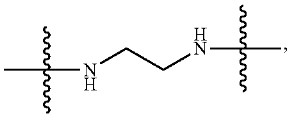

or

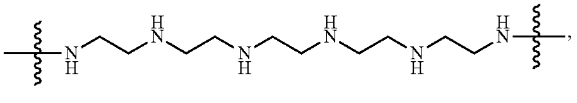

or any combination thereof.

In a further aspect, the invention relates to a polyglycidol having a degree of branching of less than about 0.25. For example, the degree of branching can less than about 0.20, less than about 0.15, or less than about 0.10.

C. Nanoparticles

Also disclosed herein is a nanoparticle comprising one or more compounds or polymers disclosed herein. In one aspect, the nanoparticle is made from one or more compounds or polymers disclosed herein, for example, the nanoparticle is made from one or more polymers disclosed herein. In one aspect, the nanoparticle comprises crosslinked polymers disclosed herein.

In one aspect, the nanoparticle further comprises at least one pharmaceutically active agent and/or biologically active agent.

In one aspect, the nanoparticle is biodegradable. The biodegradability can depend on the number of hydrolysable bonds, such as ester bonds, present in the compounds making up the nanoparticle.

In one aspect, the nanoparticle is hydrophilic. In another aspect, the t at least one pharmaceutically active agent and/or biologically active agent is hydrophobic. In another aspect, the at least one pharmaceutically active agent and/or biologically active agent is a protein, DNA, or SiRNA. In one aspect, the at least one pharmaceutically active agent and/or biologically active agent is covalently bonded to the nanoparticle.

In one aspect, the nanoparticle is between 1 nm and 1000 nm in diameter. In another aspect, the nanoparticle is between 1 nm and 750 nm in diameter. In yet another aspect, the nanoparticle is between 1 nm and 500 nm in diameter. In yet another aspect, the nanoparticle is between 1 nm and 250 nm in diameter. In yet another aspect, the nanoparticle is between 1 nm and 100 nm in diameter.

In one aspect, the nanoparticle comprises reactive functionalities, such as a hydroxyl group, an amine group, a thiol group, an allyl group, an epoxide, or an alkyne group, or a combination thereof.

D. Compositions and Pharmaceutical Compositions

Also disclosed herein are compositions, such as pharmaceutical compositions.

In one aspect, the pharmaceutical composition comprises a) a compound or polymer disclosed herein; b) pharmaceutically active agent and/or biologically active agent; and c) a pharmaceutically acceptable carrier.

In one aspect, the pharmaceutical composition comprises a) a nanoparticle disclosed herein; b) pharmaceutically active agent and/or biologically active agent; and c) a pharmaceutically acceptable carrier.

In one aspect, the invention relates to pharmaceutical compositions comprising the disclosed compounds and/or nanoparticles; pharmaceutically active agent and/or biologically active agent, and a pharmaceutically acceptable carrier or salt thereof. In an aspect, the disclosed pharmaceutical compositions can be provided comprising a therapeutically effective amount of the therapeutic agent, diagnostic agent, or prophylactic agent, or a mixture thereof, and a pharmaceutically acceptable carrier. The disclosed pharmaceutical compositions can be provided comprising a prophylactically effective amount of the therapeutic agent, diagnostic agent, or prophylactic agent, or a mixture thereof, and pharmaceutically acceptable carrier.

In one aspect, the pharmaceutical composition comprises one or more pharmaceutically active agent and/or biologically active agents. The compounds and nanoparticles disclosed herein are capable of being loaded with several different classes of therapeutics. Thus, the pharmaceutical composition is capable of delivering at least two different classes of therapeutics. For example, the therapeutic agent can comprise a MEK inhibitor and a bone morphogenetic protein 2 (BMP2) growth factor. In one aspect, the therapeutic agent is hydrophobic. The compounds and nanoparticles are capable of being a delivery vehicle for therapeutic agents, diagnostic agents, or prophylactic agents that were previously difficult to deliver due to their physical properties, such as their hydrophobicity. In one aspect, an effective amount of a therapeutic agent, diagnostic agent, or prophylactic agent can be present in the pharmaceutical composition. For example, an effective amount of a therapeutic agent, diagnostic agent, or prophylactic agent can be loaded in the compounds or nanoparticles disclosed herein.

The pharmaceutical carrier employed can be, for example, a solid, liquid, or gas. Examples of solid carriers include lactose, terra alba, sucrose, talc, gelatin, agar, pectin, acacia, magnesium stearate, and stearic acid. Examples of liquid carriers are sugar syrup, peanut oil, olive oil, and water. Examples of gaseous carriers include carbon dioxide and nitrogen.

In preparing the compositions for oral dosage form, any convenient pharmaceutical media can be employed. For example, water, glycols, oils, alcohols, flavoring agents, preservatives, coloring agents and the like can be used to form oral liquid preparations such as suspensions, elixirs and solutions; while carriers such as starches, sugars, microcrystalline cellulose, diluents, granulating agents, lubricants, binders, disintegrating agents, and the like can be used to form oral solid preparations such as powders, capsules and tablets. Because of their ease of administration, tablets and capsules are the preferred oral dosage units whereby solid pharmaceutical carriers are employed. Optionally, tablets can be coated by standard aqueous or nonaqueous techniques The instant compositions include compositions suitable for oral, rectal, topical, and parenteral (including subcutaneous, intramuscular, and intravenous) administration, although the most suitable route in any given case will depend on the particular host, and nature and severity of the conditions for which the active ingredient is being administered. The pharmaceutical compositions can be conveniently presented in unit dosage form and prepared by any of the methods well known in the art of pharmacy.

Pharmaceutical compositions of the present invention suitable for parenteral administration can be prepared as solutions or suspensions of the active compounds in water. A suitable surfactant can be included such as, for example, hydroxypropylcellulose. Dispersions can also be prepared in glycerol, liquid polyethylene glycols, and mixtures thereof in oils. Further, a preservative can be included to prevent the detrimental growth of microorganisms.

Pharmaceutical compositions of the present invention suitable for injectable use include sterile aqueous solutions or dispersions. Furthermore, the compositions can be in the form of sterile powders for the extemporaneous preparation of such sterile injectable solutions or dispersions. In all cases, the final injectable form must be sterile and must be effectively fluid for easy syringability. The pharmaceutical compositions must be stable under the conditions of manufacture and storage; thus, preferably should be preserved against the contaminating action of microorganisms such as bacteria and fungi. The carrier can be a solvent or dispersion medium containing, for example, water, ethanol, polyol (e.g., glycerol, propylene glycol and liquid polyethylene glycol), vegetable oils, and suitable mixtures thereof.

Pharmaceutical compositions of the present invention can be in a form suitable for topical use such as, for example, an aerosol, cream, ointment, lotion, dusting powder, mouth washes, gargles, and the like. Further, the compositions can be in a form suitable for use in transdermal devices. These formulations can be prepared, utilizing a compound of the invention, or pharmaceutically acceptable salts thereof, via conventional processing methods. As an example, a cream or ointment is prepared by mixing hydrophilic material and water, together with about 5 wt % to about 10 wt % of the compound, to produce a cream or ointment having a desired consistency.

Pharmaceutical compositions of this invention can be in a form suitable for rectal administration wherein the carrier is a solid. It is preferable that the mixture forms unit dose suppositories. Suitable carriers include cocoa butter and other materials commonly used in the art. The suppositories can be conveniently formed by first admixing the composition with the softened or melted carrier(s) followed by chilling and shaping in moulds.

In addition to the aforementioned carrier ingredients, the pharmaceutical formulations described above can include, as appropriate, one or more additional carrier ingredients such as diluents, buffers, flavoring agents, binders, surface-active agents, thickeners, lubricants, preservatives (including anti-oxidants) and the like. Furthermore, other adjuvants can be included to render the formulation isotonic with the blood of the intended recipient. Compositions containing a compound of the invention, and/or pharmaceutically acceptable salts thereof, can also be prepared in powder or liquid concentrate form.

It is understood, however, that the specific dose level for any particular patient will depend upon a variety of factors. Such factors include the age, body weight, general health, sex, and diet of the patient. Other factors include the time and route of administration, rate of excretion, drug combination, and the type and severity of the particular disease undergoing therapy.

The present invention is further directed to a method for the manufacture of a medicament for treatment of a disorder in a subject (e.g., humans) comprising combining one or more disclosed compounds, products, or compositions with a pharmaceutically acceptable carrier or diluent. Thus, in one aspect, the invention relates to a method for manufacturing a medicament comprising combining at least one disclosed compound, a therapeutic agent, diagnostic agent, or prophylactic agent, or a mixture thereof, with a pharmaceutically acceptable carrier or diluent.

It is understood that the disclosed compositions can be prepared from the disclosed compounds. It is also understood that the disclosed compositions can be employed in the disclosed methods of using.

a. Methods of Using the Pharmaceutical Compositions

Disclosed herein is a drug delivery method comprising the step of administering to a subject a composition comprising a polymer or nanoparticle disclosed herein, in combination with at least one pharmaceutically active agent and/or biologically active agent. In one aspect, the composition further comprises a pharmaceutically acceptable carrier. In one aspect, the method comprises administering an effective amount of the pharmaceutically active agent and/or biologically active agent to the subject. In one aspect, the effective amount is a therapeutically effective amount. Such amount can be determined by one skilled in the art.

In one aspect, the therapeutic agent is a cancer agent. In another aspect, the therapeutic agent is a protein, DNA, or SiRNA.

In one aspect, the subject is an animal. In a further aspect, the subject is a mammal. In a yet further aspect, the subject is a primate. In a still further aspect, the subject is a human. In an even further aspect, the subject is a patient.

In a further aspect, the pharmaceutical composition is administered following identification of the subject in need of treatment of disorder. In a still further aspect, the pharmaceutical composition is administered following identification of the subject in need of prevention of a disorder. In an even further aspect, the subject has been diagnosed with a need for treatment of a disorder prior to the administering step.

In one aspect, the method delivers one or more therapeutic agents. The compounds and nanoparticles disclosed herein are capable of being loaded with several different classes of therapeutics. Thus, the method is capable of delivering at least two different classes of therapeutics. For example, the therapeutic agent can comprise a MEK inhibitor and a bone morphogenetic protein 2 (BMP2) growth factor.

In one aspect, the method comprises administering an effective amount of the pharmaceutically active agent and/or biologically active agent to the subject. In one aspect, the effective amount is a therapeutically effective amount. Such amount can be determined by one skilled in the art.

In one aspect, the therapeutic agent is a cancer agent. In another aspect, the pharmaceutically active agent and/or biologically active agent is a protein, DNA, or SiRNA.

In one aspect, the subject is an animal. In a further aspect, the subject is a mammal. In a yet further aspect, the subject is a primate. In a still further aspect, the subject is a human. In an even further aspect, the subject is a patient.

In a further aspect, the pharmaceutical composition is administered following identification of the subject in need of treatment of disorder. In a still further aspect, the pharmaceutical composition is administered following identification of the subject in need of prevention of a disorder. In an even further aspect, the subject has been diagnosed with a need for treatment of a disorder prior to the administering step.

E. Method of Making Polymers

Also disclosed here is a method of making a polymer, the method comprising the step of polymerizing glycidol in an aqueous solution, wherein the method makes a polymer disclosed herein. Thus, in one aspect, that polymer comprises repeating units selected from:

A1

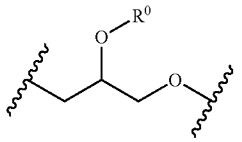

,

A2

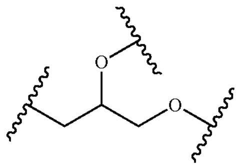

,

B1

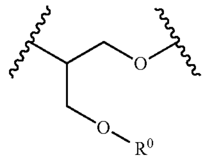

, and

B2

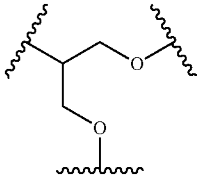

;

wherein $R^0$ is selected from H, alkyl, $NH_2$, and $R^1$; wherein $R^1$ comprises a crosslinking functionality; wherein repeating units A1, A2, B1, and B2 account for at least about 50 wgt % of the polymer; and wherein the ratio of (A1+A2):(B1+B2) is greater than 1.

In one aspect, the aqueous solution is a buffer. The buffer can be any type of buffer. For example, the buffer can be a phosphate buffer. Phosphate buffers, such as phosphate buffered saline, are known in the art. For example, the phosphate buffer can comprise sodium phosphate and sodium chloride alone or in combination with other substances, such as, for example, potassium chloride and potassium phosphate.

In one aspect, the polymerization is initiated by glycidol.

In one aspect, the polymerization step of glycidol is not exothermic.

In one aspect, the aqueous solution, such as a buffer, has an acidic pH. For example, the aqueous solution, such as a buffer, can have a pH from about 3.0 to about 7.0. In another example, the aqueous solution, such as a buffer, can have a pH from about 5.0 to about 7.0. In yet another example, the aqueous solution, such as a buffer, can have a pH from about 5.5 to about 7.0. In yet another example, the aqueous solution, such as a buffer, can have a pH from about 5.5 to about 6.5. In yet another example, the aqueous solution, such as a buffer, can have a pH from about 5.0 to about 6.5.

In yet another example, the aqueous solution, such as a buffer, can have a pH from about 3.0 to about 9.0.

In one aspect, the concentration of glycidol in the aqueous solution is from about 50 mM to about 1M prior to the step of polymerizing. In another aspect, the concentration of glycidol in the aqueous solution is from about 100 mM to about 500 mM prior to the step of polymerizing. In yet another aspect, the concentration of glycidol in the aqueous solution is from about 200 mM to about 500 mM prior to the step of polymerizing.

In one aspect, the aqueous solution does not comprise a metal catalyst. The metal catalyst can be a catalyst capable of polymerizing glycidol. For example, the metal catalyst can be a tin catalyst. The tin catalyst, can be, for example, $Sn(OTf)_2$.

In one aspect, the aqueous solution is a buffer and does not comprise a metal catalyst. For example, the aqueous solution can be a buffer, such as a phosphate buffer, with a pH from about 5.0 to about 7.0 and not comprise a metal catalyst, such as a tin catalyst, for example, $Sn(OTf)_2$.

In one aspect, the polymerization step is performed at a temperature of from 50° C. to 120° C. In another aspect, the polymerization step is performed at a temperature of from 55° C. to 110° C. In yet another aspect, the polymerization step is performed at a temperature of from 60° C. to 100° C. In yet another aspect, the polymerization step is performed at a temperature of from 70° C. to 90° C. In yet another aspect, the polymerization step is performed at a temperature of about 80° C.

In one aspect, the polymerization of the polymer is initiated from a macromolecular structure. In one aspect, the polymerization is initiated from —OH group present in a macromolecular structure. In one aspect, the method further comprises the step of reacting a macromolecular structure with an agent to obtain the —OH group present in a macromolecular structure.

In one aspect, the weight average molecular weight of the macromolecular structure increases at least 5 kDa after the polymerization of the polymer is completed. Thus, the polymer, as disclosed herein, covalently bonded to the macromolecular structure can have a weight average molecular weight of at least 5 kDa. In one aspect, the weight average molecular weight of the macromolecular structure increases at least 10 kDa after the polymerization of the polymer is completed. Thus, the polymer, as disclosed herein, covalently bonded to the macromolecular structure can have a weight average molecular weight of at least 10 kDa. In one aspect, the weight average molecular weight of the macromolecular structure increases from 5 to 30 kDa after the polymerization of the polymer is completed. Thus, the polymer, as disclosed herein, covalently bonded to the macromolecular structure can have a weight average molecular weight from 5 to 30 kDa.

In one aspect, the macromolecular structure is a biological agent. Suitable biological agents include, but are not limited to, proteins, antibodies, DNA, RNA, and Si-RNA.

In one aspect, the method further comprises the step of crosslinking the polymer. The step of crosslinking the polymer can be performed when $R^1$ is present.

In another aspect, the resultant polymer further comprises at least one repeating unit formed from a monomer selected from:

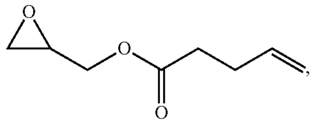,

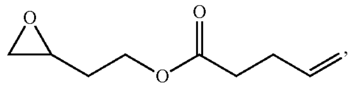,

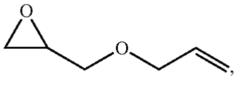, and 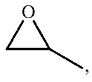, or a combination thereof.

In one aspect, the method further comprises the step of crosslinking the polymer with crosslinks, wherein the wherein the crosslinks comprises $-[CH_2]_{2-30}-$, 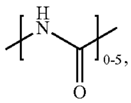, 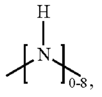, 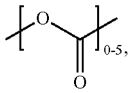,

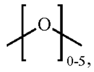, and 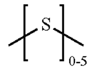

wherein at least one of

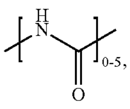, 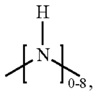, 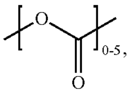, 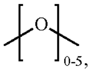, and 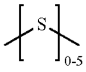

is not 0.

In another aspect, the polymer is linear when the first compound comprises an ester moiety. In another aspect, the polymer is semi-branched when the first polymer comprises a glycidol moiety. Non-limiting examples of first compounds comprising an ester moiety are 2-oxepane-1,5-dione and lactones, such as δ-valerolactone and α-allyl-δ-valerolactone. Non-limiting examples of first compounds comprising a glycidol moiety are glycidol, allyl-glycidol ether, glycidyl ester allyl, and ethoxyethyl glycidyl ether. In one aspect, the method comprises polymerizing the first compound comprising a glycidol moiety and/or an ester moiety with a second compound comprising a glycidol moiety and/or a ester moiety, thereby making a copolymer. In one aspect, the first compound comprises a glycidol moiety and the second compound comprises an ester moiety. In one aspect, the first compound comprises a glycidol moiety and the second compound comprises a glycidol moiety and an ester moiety.

F. Manufacture of a Medicament

In one aspect, the invention relates to a method for the manufacture of a medicament for treatment of a disorder comprising combining a disclosed polymer or nanoparticle with a therapeutically effective amount of a therapeutic agent, diagnostic agent, or prophylactic agent, or a mixture thereof and with a pharmaceutically acceptable carrier or diluent.

G. Kits

Disclosed herein is a kit comprising a polymer or nanoparticle disclosed herein and a therapeutic agent, diagnostic agent, or prophylactic agent, or a mixture thereof and one or more of: a) instructions of delivering the therapeutic agent, diagnostic agent, or prophylactic agent, or a mixture thereof; b) instructions for using the therapeutic agent, diagnostic agent, or prophylactic agent, or a mixture thereof to treat a disorder.

H. Experimental

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

As briefly discussed above, while hyperbranched systems formed through the polymerization of glycidol have shown applicability, the ability to form polymers with a controlled degree of branching in an aqueous solution was investigated. In one aspect, controlled polymerization can allow the lower branching systems to achieve a better clearance but also allow the formation of nanoparticles which is not possible with globular starting materials. Furthermore, semi-branched polyglycidols made from a metal free green method have the potential to find wide applications as building blocks for hydrogels or as matrix materials to embed biological materials in injectable formulations.

In a still further aspect, controlled degree of branching and linear systems which can be synthesized more easily can used for targeted delivery of drug molecules and biological cargo. In a yet further aspect, semi-branched structures with that are more favorable in vivo.

Figure 3:
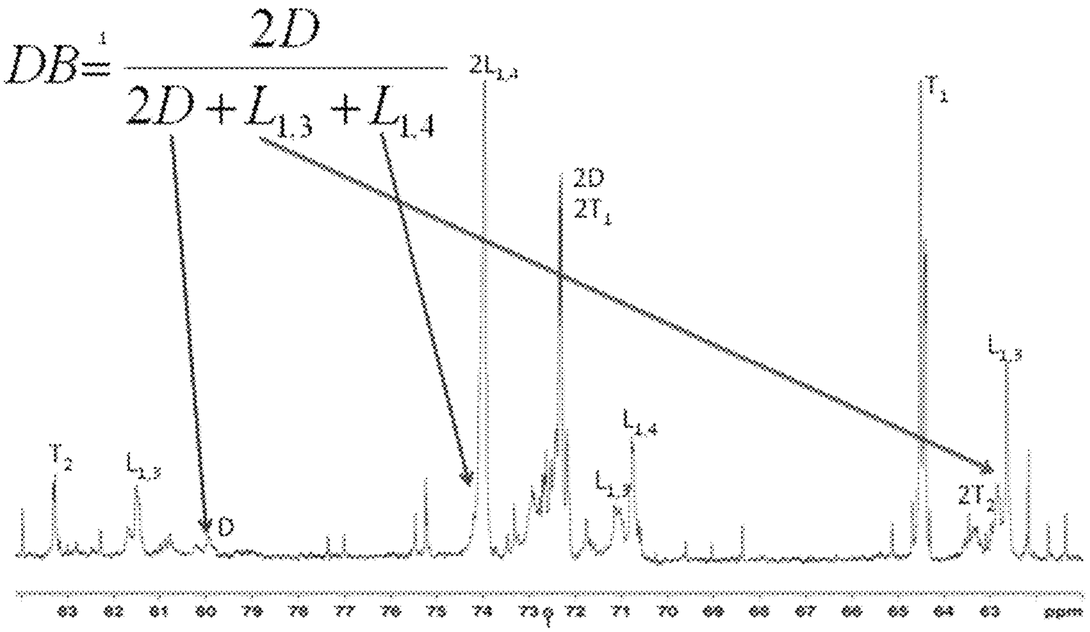
FIG. 3 shows the equation for degree of branching in the resultant polymers with the variables referring to the integration values obtained from quantitative $^{13}$CNMR investigation.
Figure 4:
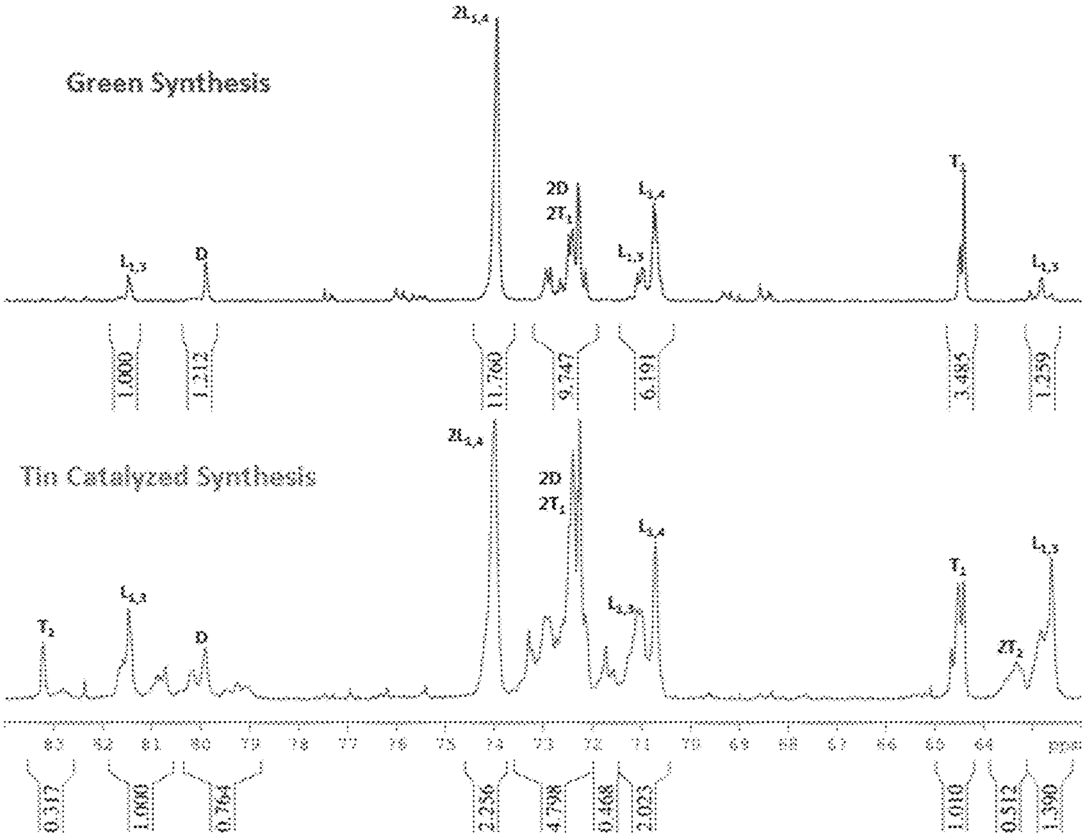
FIG. 4 shows the $^{13}$C-NMR of a glycidol homopolymer prepared from an aqueous solution and a glycidol homopolymer prepared from tin catalyzed synthesis.

In various aspects, the polymerization of glycidol in an aqueous solution can be influenced by a variety of parameters, including but not limited to, the temperature, concentration, and pH. Homopolymers of glycidol were made under different conditions as shown in Tables 1-3, below. The degree of branching in the resultant polymers can be calculated using equation 1 shown below, with the variables referring to the integration values obtained from quantitative $^{13}$CNMR investigation, as further shown in FIG. 3. Unique peaks arise in the 13C-NMR based on the type of ring opening undergone by each monomer. The $^{13}$C-NMR of a glycidol homopolymer prepared from an aqueous solution and a glycidol homopolymer prepared from tin catalyzed synthesis are shown in FIG. 4.

$$DB = \frac{2D}{2D + L_{1,3} + L_{1,4}} \quad \text{(Eq. 1)}$$

TABLE 1

| Region | Shift (ppm) | 60° C. (133 mM) | 80° C. (133 mM) | 100° C. (133 mM) |
|---|---|---|---|---|
| $L_{1,3}$ | 81.0-82.0 | 1 | 1 | 1 |
| D | 79.5-80.5 | 1.5017 | 1.2115 | 1.2699 |
| 2 $L_{1,4}$ | 73.5-74.5 | 12.483 | 11.7599 | 10.6349 |
| 2D, 2T | 72.0-73.5 | 9.5734 | 9.7469 | 10.154 |
| $L_{1,3}$, $L_{1,4}$ | 70.5-72.0 | 6.6037 | 6.1915 | 5.6924 |
| T | 64.0-65.0 | 3.274 | 3.4851 | 3.6807 |
| $L_{1,3}$ | 62.0-63.5 | 1.1331 | 1.2588 | 1.4066 |
| Degree of Branching | | 0.29 | 0.25 | 0.27 |

TABLE 2

| Region | Shift (ppm) | 2x GLY (265 mM) | 3x GLY (398 mM) | 2x PB (66 mM) | 3x PB (44 mM) | 4x PB (33 mM) | Subsequent Addition |
|---|---|---|---|---|---|---|---|
| $L_{1,3}$ | 81.0-82.0 | 1 | 1 | 1 | 1 | 1 | 1 |
| D | 79.5-80.5 | 1.2789 | 1.1456 | 1.2074 | 0.8681 | 0.8332 | 1.5353 |
| 2 $L_{1,4}$ | 73.5-74.5 | 10.9784 | 11.577 | 11.7041 | 12.1723 | 12.7717 | 9.9037 |
| 2D, 2T | 72.0-73.5 | 8.8949 | 9.758 | 9.3083 | 9.6674 | 9.8932 | 10.3131 |
| $L_{1,3}$, $L_{1,4}$ | 70.5-72.0 | 5.7718 | 5.8661 | 5.9154 | 5.2936 | 5.3063 | 5.1808 |
| T | 64.0-65.0 | 3.0503 | 3.7491 | 3.4265 | 5.081 | 5.4274 | 3.8334 |
| $L_{1,3}$ | 62.0-63.5 | 1.1353 | 1.0645 | 1.0847 | 1.2939 | 1.3443 | 1.2969 |
| Degree of Branching | | 0.28 | 0.25 | 0.26 | 0.19 | 0.18 | 0.33 |

TABLE 3

| Region | Shift (ppm) | pH = 3.75 (133 mM) | pH = 6.00 (133 mM) | pH = 7.99 (133 mM) | DI Water |
|---|---|---|---|---|---|
| $L_{1,3}$ | 81.0-82.0 | 1 | 1 | 1 | 1 |
| D | 79.5-80.5 | 1.2285 | 1.2115 | 1.2447 | 1.0542 |
| 2 $L_{1,4}$ | 73.5-74.5 | 10.4149 | 11.7599 | 10.7286 | 11.2358 |
| 2D, 2T | 72.0-73.5 | 8.8071 | 9.7469 | 8.9013 | 8.346 |
| $L_{1,3}$, $L_{1,4}$ | 70.5-72.0 | 5.4975 | 6.1915 | 5.6529 | 5.4162 |
| T | 64.0-65.0 | 2.9902 | 3.4851 | 2.9783 | 3.5474 |

TABLE 3-continued

| Region | Shift (ppm) | pH = 3.75 (133 mM) | pH = 6.00 (133 mM) | pH = 7.99 (133 mM) | DI Water |
|---|---|---|---|---|---|
| $L_{1,3}$ | 62.0-63.5 | 1.2266 | 1.2588 | 1.2039 | 1.4076 |
| Degree of Branching | | 0.28 | 0.25 | 0.27 | 0.23 |

Figure 5:
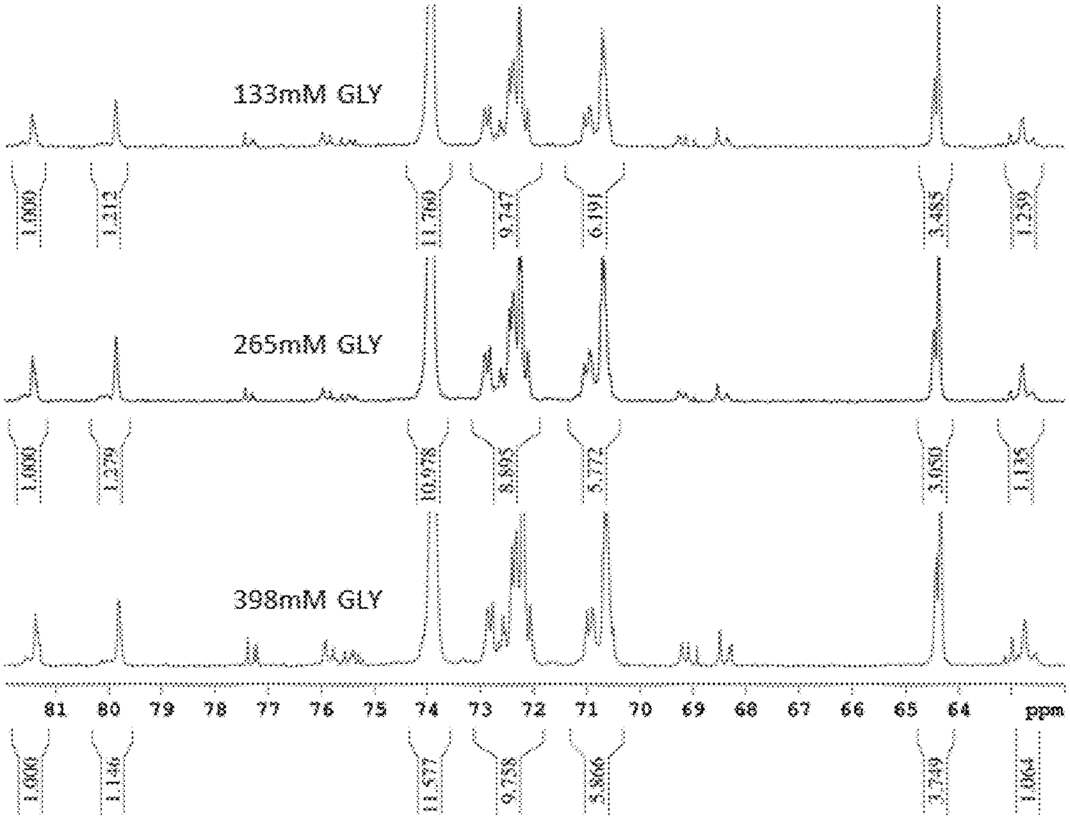
FIG. 5 shows the $^{13}$C-NMR of the glycidol homopolymer described in Tables 1-3.
Figure 5:
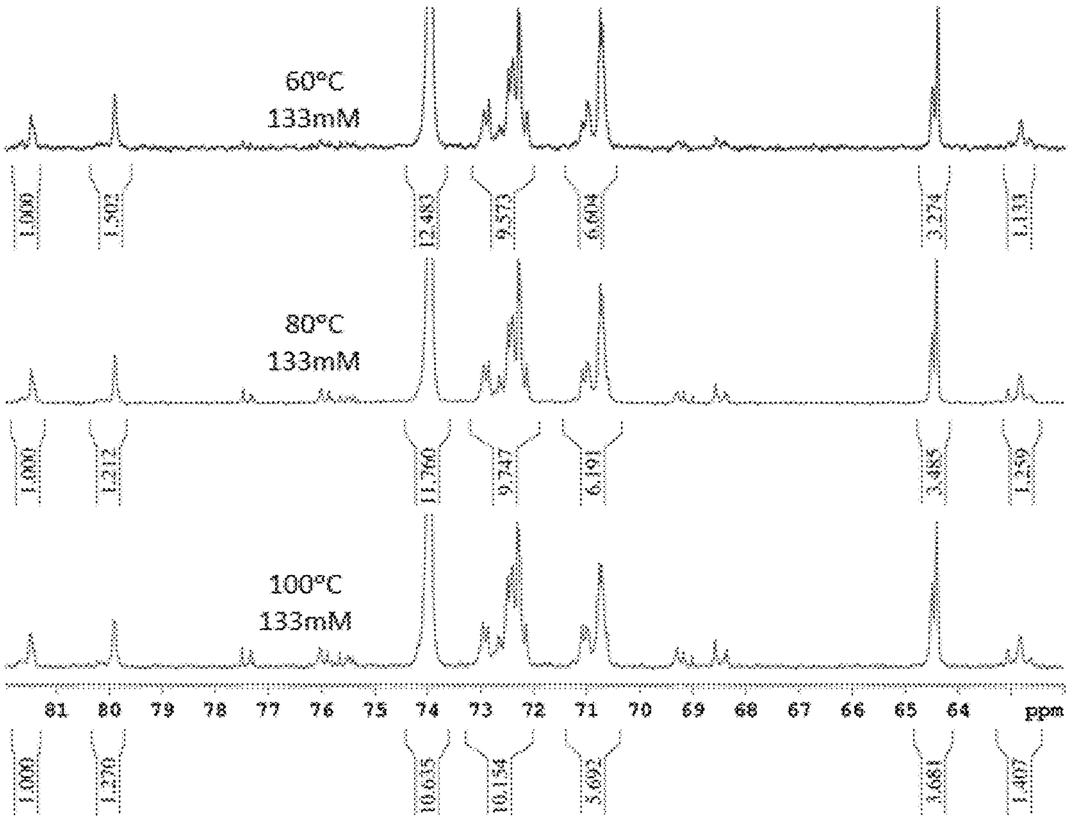
Figure 5:
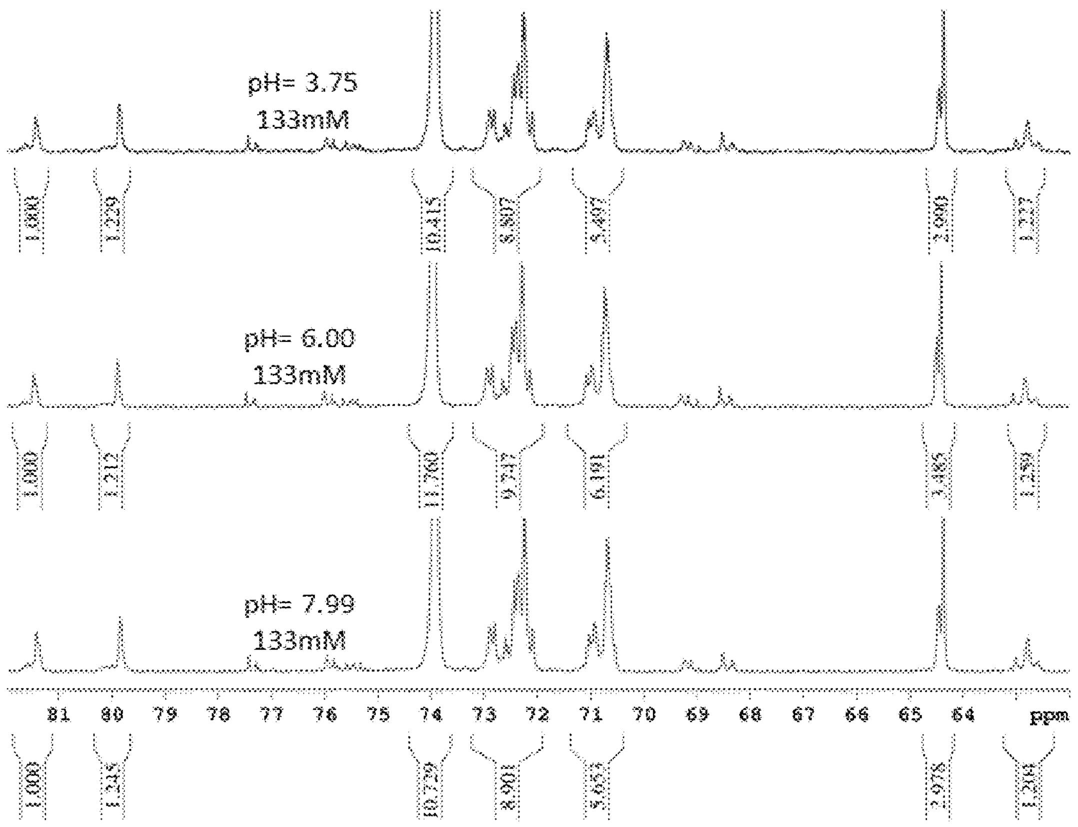
Figure 5:
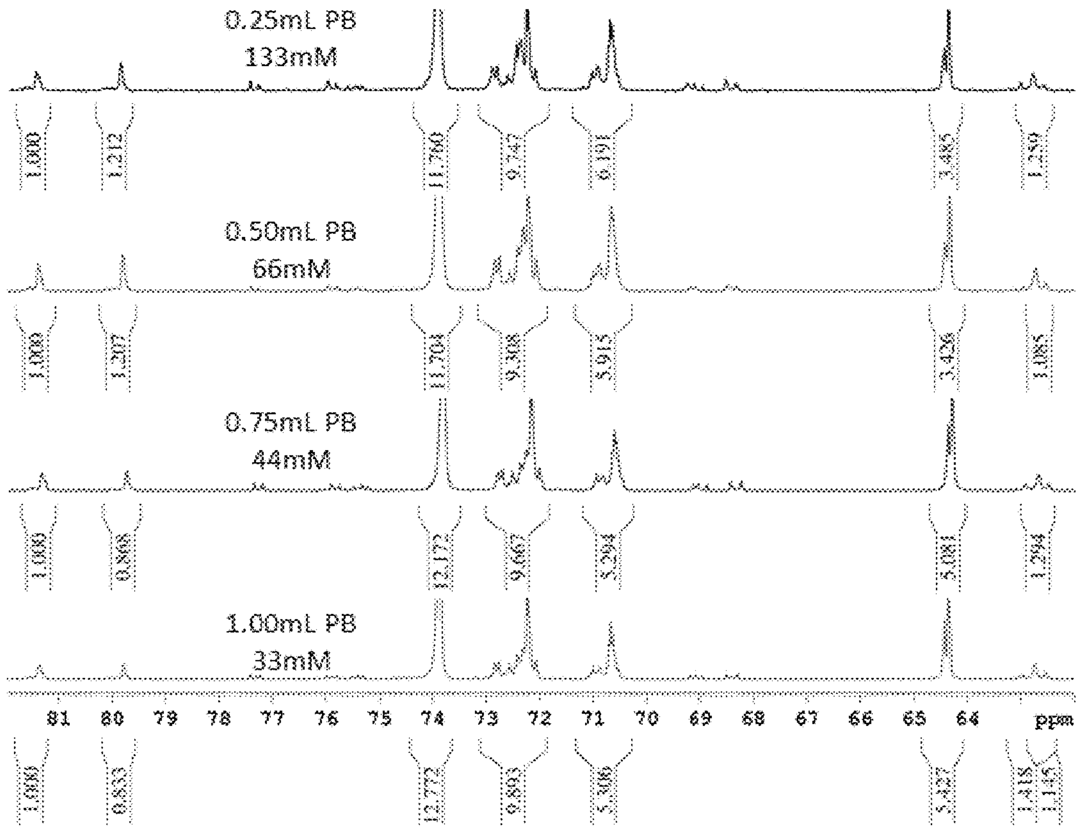

FIG. 5 shows the $^{13}$C-NMRs of a glycidol homopolymers that are described in Tables 1-3.

The capability to choose the degree of branching optimized for the poly(glycidol) system affords the ability to modify the synthesized polymers based on the preferred application for each. This possibility indicates that the present invention can be used in a wide range of applications with the reaction temperature being the determining factor for the polymer architecture. Without wishing to be bound by a particular theory, such control over this synthetic method allows for more effective and diverse potential. Poly(glycidol) branching possibilities are shown in FIG. 6. As shown in FIG. 6, and as discussed elsewhere herein, polymerization of glycidol in an aqueous solution, such as a buffer, produces a polymer without a T2 moiety.

Tables 4 and 5 shows the abundance of the branching of the polyglycidols made herein.

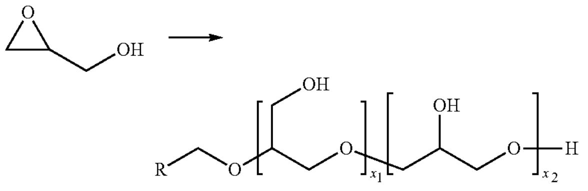

Figure 7:
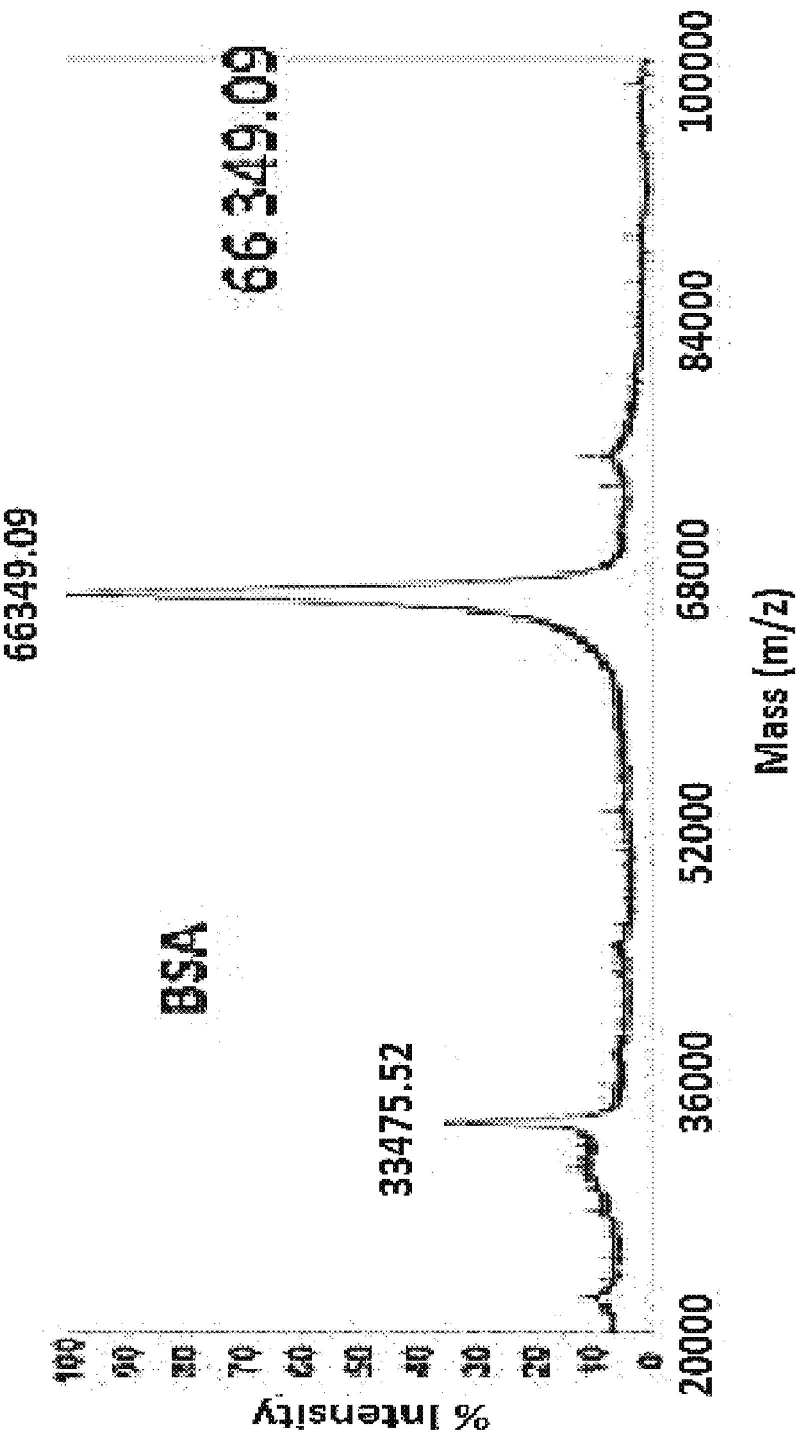
FIG. 7 shows the molecular weight increase in bovine serum albumin (BSA) once polyglycidol has been polymerized from the BSA.
Figure 7:
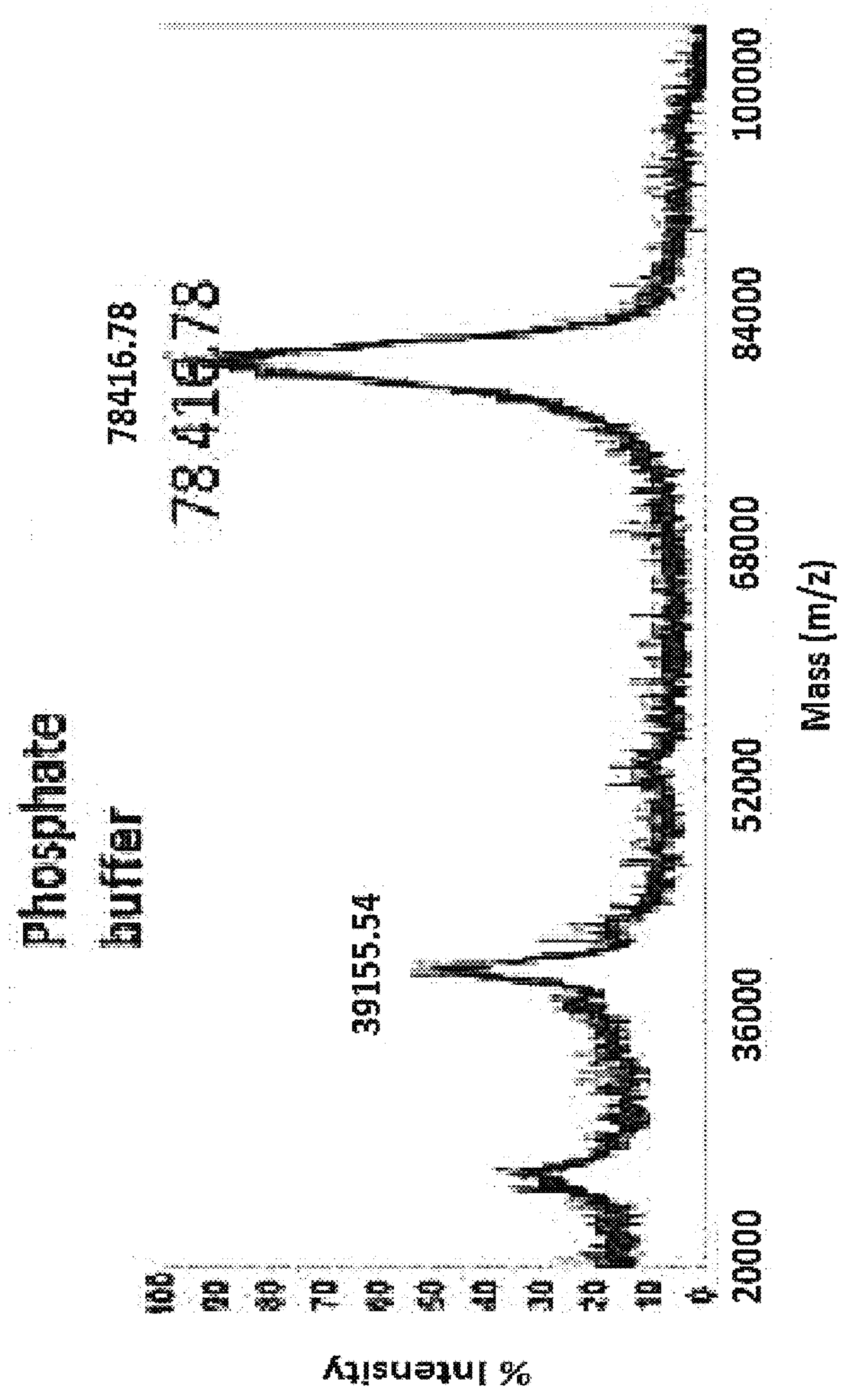

Glycidol was also polymerized from a macromolecular structure (i.e. a protein, BSA) directly in a phosphate buffer, as shown in FIG. 2. The molecular weight of the BSA increased about 12 kDa once the glycidol had been polymerized in a buffer onto the BSA, as shown in FIG. 7.

Figure 8:
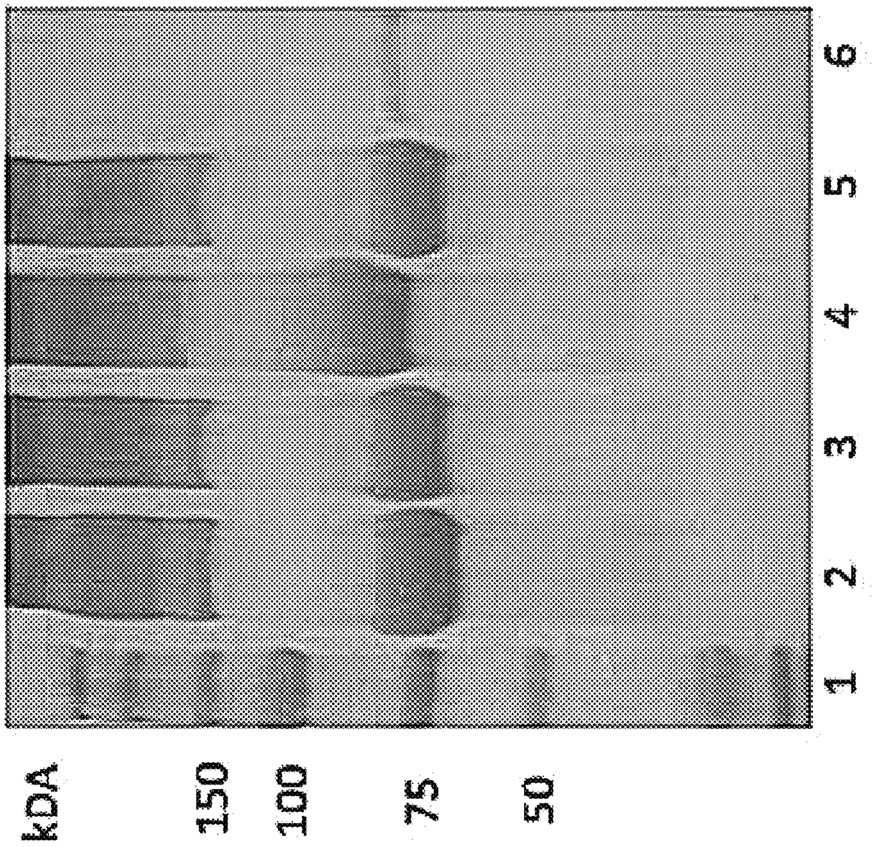
FIG. 8 shows the increase in molecular weight of BSA and BSA-polyglycidol conjugates.

FIG. 8 shows the increase in molecular weight of BSA and BSA-polyglycidol conjugates. In FIG. 8, BSA-ExB-PB indicates that the polymerization was made in a phosphate buffer without a catalyst (without a tin catalyst); BSA-ExB-DMF indicates that the polymerization was made in DMF with a tin catalyst; BSA-ExB-DMSO indicates that the polymerization was made in DMSO with a tin catalyst.

Figure 9:
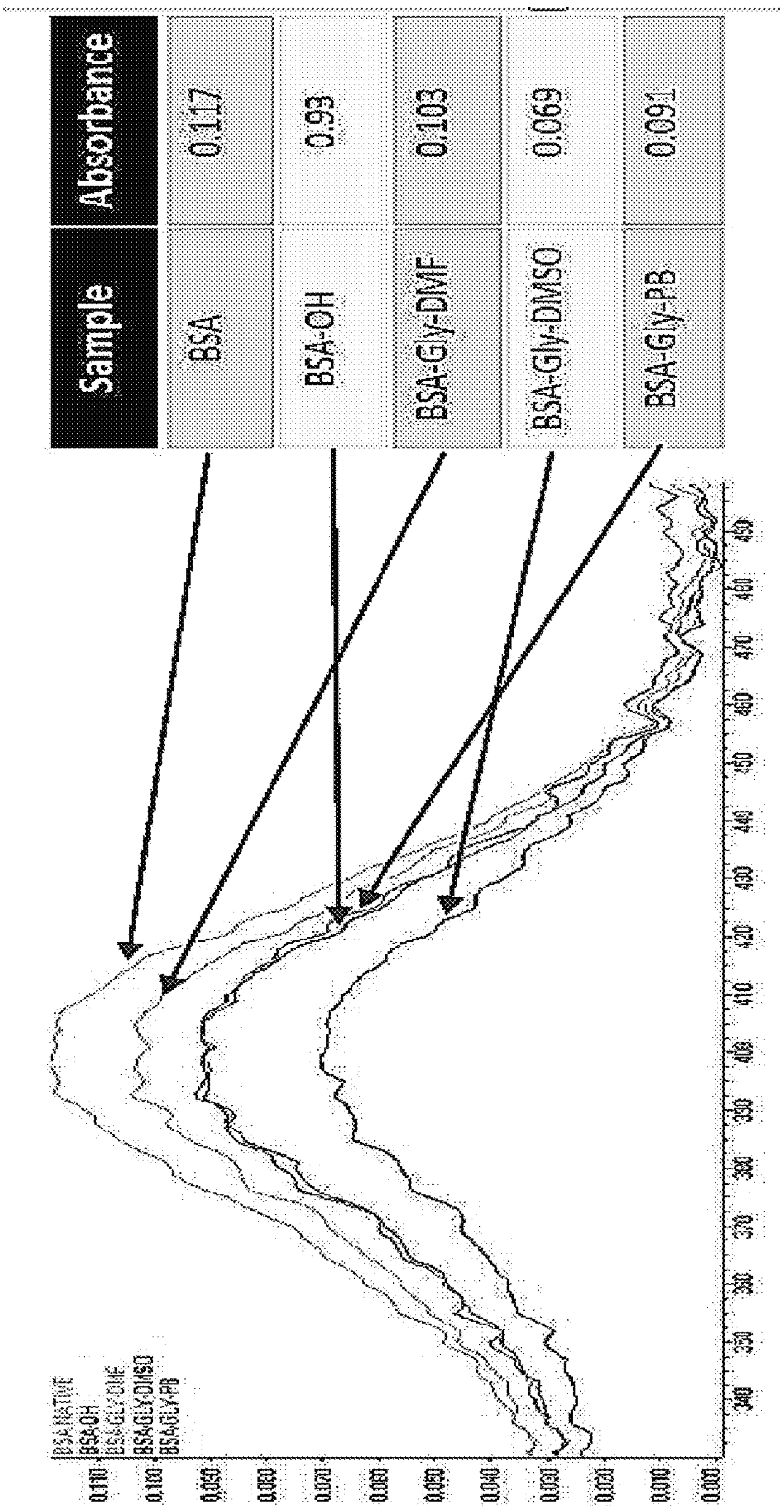
FIG. 9 shows the bioactivity as a function of absorbance of BSA and the BSA-polyglycidol conjugates shown in FIG. 8.

FIG. 9 shows the bioactivity as a function of absorbance of BSA and the BSA-polyglycidol conjugates discussed in FIG. 8.

TABLE 4

| Unit | 60° C. (133 mM) | 80° C. (133 mM) | 100° C. (133 mM) | 2x GLY (265 mM) | 3x GLY (398 mM) | 2x PB (66 mM) | 3x PB (44 mM) | 4x PB (33 mM) |
|---|---|---|---|---|---|---|---|---|
| Terminal (T1) | 27% | 29% | 32% | 28% | 32% | 30% | 38% | 39% |
| Linear 1, 3 (B1) | 9% | 11%% | 12% | 10% | 9% | 9% | 10% | 10% |
| Linear 1, 4 (A1) | 51% | 50% | 45% | 50% | 49% | 51% | 45% | 45% |
| Dendritic (B2 and/or A2) | 13% | 10% | 11% | 12% | 10% | 10 | 7% | 6% |

TABLE 5

| Unit | Subsequent Addition | pH = 3.75 (133 mM) | pH = 6.00 (133 mM) | pH = 7.99 (133 mM) | DI Water |
|---|---|---|---|---|---|
| Terminal (T1) | 33% | 28% | 29% | 28% | 31% |
| Linear 1, 3 (B1) | 11% | 12% | 11% | 11% | 12% |
| Linear 1, 4 (A1) | 42% | 49% | 50% | 50% | 48% |
| Dendritic (B2 and/or A2) | 13% | 11% | 10% | 11% | 9% |

The objective of the following example was to show that poly(glycidol) can be formed in an aqueous solution without the use of a catalyst. Such synthetic route is considered to be "green chemistry" because the aqueous solution is not harmful to the environment. Also a poly(glycidol) formed from the aqueous solution will not include repeating units (impurities) for tetrahydrofuran which is the case when poly(glycidol) is polymerized by a tin catalyst, which is suspended in tetrahydrofuran. This can be seen in FIG. 4, which shows that the $^{13}$C-NMR of a poly(glycidol) formed by the methods disclosed herein is cleaner (i.e. the polymer is purer) as compared to the $^{13}$C-NMR of a poly(glycidol) formed by a tin catalyst.

Glycidol was polymerized directly in a phosphate buffer at an elevated temperature (80° C.), as represented by the reaction scheme below.

Figure 10:
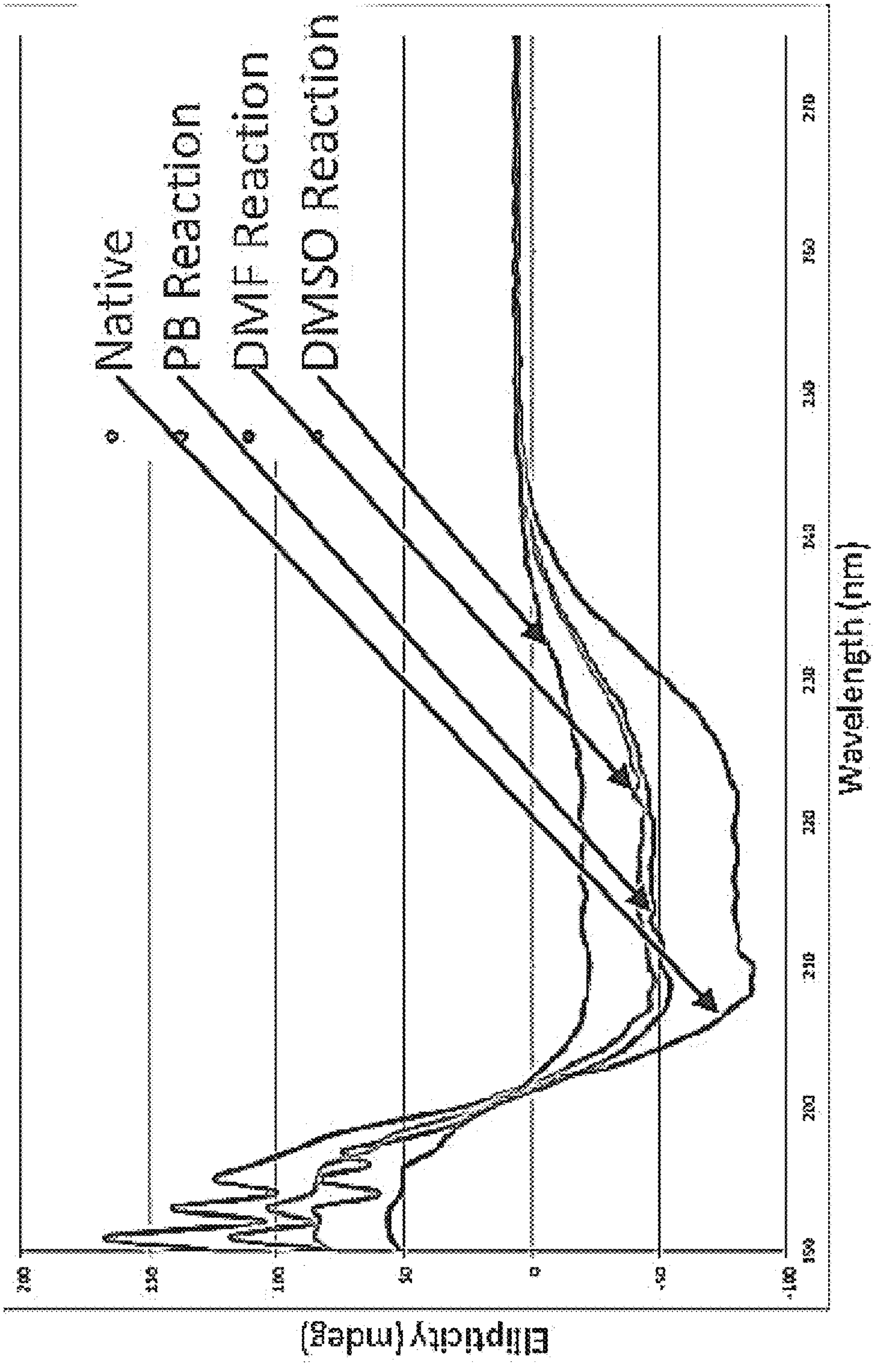
FIG. 10 shows circular dichorism, which is used to verify that the secondary structure of BSA was retained in BSA-polyglycidol conjugates.

Circular dichorism was used to verify that the secondary structure of BSA was retained in BSA-polyglycidol conjugates, as shown in FIG. 10.

The temperature studies presented herein showed that the polymerization at 80° C. gave the lowest degree of branching with a value of 0.25 which is nearly half of the value what we could achieve using the metal catalyst and isoamylacohol initiator showed by the inverse gated $^{13}$C-NMR. Since no catalyst or initiator is involved in the polymerization other than the glycidol itself, the overall peak area is cleaner in comparison to the $Sn(OTf)_2$ initiated polymerization, see FIG. 4. Polymerizations run in buffer at higher temperatures of 100° C. start to show some impurities at 77 pm. Such impurities are not observed when the polyglycidol polymerizations in run in buffer at 80° C. Gel permeation chromatography shows that the polydispersities are very narrow and are around 1.24-1.29 and much narrower in contrast to the metal catalyzed reactions which gave polymers of 1.32-1.4 PDI. As discussed above, the polymerization of glycidol in buffer without a catalyst does not experience an exothermic behavior of the polymerization, as it known from cationic polymerization procedures with glycidols. The highest yield observed was achieved when using about 400 mM of the glycidol as a starting concentration. Thus, as described herein, a green method is presented and disclosed for the polymerization of pure homopolymers of polyglycidol, wherein the branching is highly controlled.

I. Experimental Examples

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Several methods for preparing the compounds of this invention are illustrated in the following Examples. Starting materials and the requisite intermediates are in some cases commercially available, or can be prepared according to literature procedures or as illustrated herein.

The following exemplary compounds of the invention were synthesized. The Examples are provided herein to illustrate the invention, and should not be construed as limiting the invention in any way. The Examples are typically depicted in free base form, according to the IUPAC naming convention. However, some of the Examples were obtained or isolated in salt form.

As indicated, some of the Examples were obtained as racemic mixtures of one or more enantiomers or diastereomers. The compounds may be separated by one skilled in the art to isolate individual enantiomers. Separation can be carried out by the coupling of a racemic mixture of compounds to an enantiomerically pure compound to form a diastereomeric mixture, followed by separation of the individual diastereomers by standard methods, such as fractional crystallization or chromatography. A racemic or diastereomeric mixture of the compounds can also be separated directly by chromatographic methods using chiral stationary phases.

The experiments presented herein show a green synthesis method for the preparation of polyglycidol in buffer or water with a high degree of control is presented. Polymerization were conducted in PBS buffer with a pH ranging from 3.8, 6.0 to 8.0, and deionized water at temperatures of 60° C., 80° C. and 100° C. The catalytic reactivity between water and glycidol afforded a green polymerization technique for the facile synthesis of polyglycidol systems with semibranched architectures with a degree of branching (DB) of 0.24 which situates the polymers between purely linear (DB=0) and hyperbranched (DB=0.56-0.63) systems. This disclosed herein side-step the strenuous polymerization condition required for most polyglycidol structures and provides well-controlled and reproducible species with a high degree of linearity and narrow polydispersities of 1.29-1.34 via the first green synthesis of polyglycidol.

1. General Methods

Glycidol (Sigma Aldrich, 96%) was vacuum distilled prior to use. 3-Buten-1-ol (Sigma Aldrich Inc.), Tin(II) trifluoromethanesulfonate (Strem Chemicals Inc., 99%), N,N-Dimethylformamide (DMF, Sigma Aldrich 99.8%), N,N,N',N'-ethylenediaminetetraacetic acid (EDTA, Sigma Aldrich, 99.4-100.6%), triethylamine (Sigma Aldrich, ≥99%), bovine serum albumin (BSA, Aldrich, Approx. 99%), 5,5'-dithio-bis-(2-nitrobenzenzoic acid) (Ellman's reagent, Aldrich, 99%), tris(2-carboxyethyl)phosphine hydrochloride (Sigma Aldrich, TCEP, ≥98%), and 4-nitrophenyl acetate (Fluka, ≥99%) were used as received. Dialysis membranes (Spectra/Por® 7, molecular weight cut-off (MWCO): 25,000 and 50,000 Da) were obtained from Spectrum Laboratories, Inc. Precise Tris-glycine 12% pre-cast PAGE gels were obtained from Fisher Scientific Company.

$^{1}H$ and $^{13}C$ NMR were obtained from a Bruker AV-I 400 MHz, a Bruker DRX 500 MHz, or a Bruker AV-II 600 MHz spectrometer. The reported chemical shifts are in ppm and are in reference to the corresponding residual nuclei in deuterated solvents.

Size exclusion chromatography of the glycidol homopolymers was performed in DMF at 70° C. with a flow rate of 1.0 mL/min (Wafers 1525 binary HPLC pump; columns: 7.8× 300 mm; Styragel HR 5 DMF, Styragel HR 4E, and Styragel HR 3: molecular weight range 50,000 to $4\times10^{6}$, 50 to 100,000, and 500 to 30,000 g/mol, respectively). Detection was accomplished using a Waters 2414 refractive index detector. Molecular weights were determined using polystyrene standards. Size exclusion chromatography of the glycidol homopolymers can be also performed in water using Waters Ultrahydrogel DP, 100-5000, 6 micron, Ultrahydrogel 120, 100-5000, Ultrahydrogel 250, 1000-80,000. (we are planning to do with these columns when we get them in as alternative to the DMF).

UV-vis spectra were obtained using a Thermo Scientific Nanodrop 2000.

MALD1-TOF MS of glycidol homopolymers was performed using product samples of 3 mg/mL and a α-cyano-4-hydroxycinnamic acid matrix solution of 20 mg/mL, both in methanol. To confirm the addition of the maleimide alcohol initiator to the BSA protein and the subsequent glycidol polymer growth from the BSA-OH conjugate similar parameters were used. The MALDI samples were formed using 6 mg/mL product samples in DI water and a 5 mg/mL matrix solution of sinapic acid dissolved in 2 parts 0.1% formic acid, 1 part acetonitrile. The sample and matrix were mixed in a 1:1 ratio and 1.4 μL was spotted onto the MALDI plate for characterization. The instrument used was a Voyager DE-STR MS in linear TOF mode equipped with a nitrogen gas laser at λ=337 nm with external calibration. The instrument parameters were set to: 25,000 V; 90% grid; 600 ns delay; 1000 shots per spectrum.

The use of CD spectrophotometry was employed to verify the retention of the secondary structure of the BSA protein. Spectra were obtained with a Jasco J-720 at 25±1° C. in DI water ($1.5\times10^{-5}$ M) in a cell with a path length of 1 cm (bandwidth=1 nm; step resolution=0.5 nm; scan speed=50 nm/min; response time=0.5 s). Spectral data was collected from 190-275 nm to ascertain information about the a-helix structure of the BSA protein as well as the structure of the BSA conjugates formed.

2. Synthesis of Glycidol Homopolymer in Phosphate Buffer

The glycidol monomer (2.45 g, 33 mmol, 1.0 eq) was added to a flame dried 25 mL round bottom flask (RBF). The reaction vessels were then lowered into oil baths to ensure consistent reaction temperatures, followed by the addition of PBS Buffer. After a predetermined reaction time, based upon reaction temperature, the crude viscous polymer product was dissolved in a minimal amount of methanol and precipitated into vigorously stirring ethyl acetate. The resulting solution was decanted to afford the pure GLY product as a translucent viscous material. The product was collected in methanol, transferred to a massed 6-dram vial, and the excess solvent was removed. $^{1}H$-NMR (600 MHz, $CDCl_3$) δ: 3.42-3.87 (6H). $^{13}C$-NMR (150 MHz, $CDCl_3$) δ: 81.33, 79.75 73.84, 72.36, 70.90, 70.62, 64.32, 62.71.

Poly(glycidol) as a homopolymer was synthesized using this general procedure with the modifications in temperature, concentration, and pH as shown in Tables 1-3 above.

3. Preparation of Glycidol Polymers Initiated from Protein (Bovine Serum Albumin (BSA))

a. Conjugation of BSA with Maleimide Alcohol to Obtain BSA Alcohol Conjugate

BSA (0.5 g, 7.5 μmol, 1 eq) was dissolved in phosphate buffer (PB) solution (37.5 mL, pH 7.2) in a 100 mL round bottom flask equipped with a magnetic stir bar and was then purged under $N_2$(g) for 1 h. 1-(2-hydroxyethyl)-1H-pyrrole-2,5-dione (21.23 mg, $6\times10^{-5}$ mol, 20 eq) was solubilized in nitrogen-purged DMF (2.5 mL). The maleimide solution was then added drop wise to the stirring BSA solution and the reaction was allowed to run for 20 @ 25° C. The resulting reaction mixture was dialyzed against deionized (DI) water for 36h using a MWCO of 25,000 Da, and then lyophilized to isolate the BSA Alcohol Conjugate (BSA-OH).

b. General Procedure for the Polymerization of Gly Using BSA-OH in Different Solvent Systems $Sn(OTf)_2$ (0.87 mg, 2.087 μmol), BSA-OH (80 mg, 1.198 μmol), and PB pH 6.0 (3.6 mL) were added to a 25 mL round bottom flask equipped with a magnetic stir bar and purged with $N_2$(g) for 30 minutes in an ice bath. The glycidol monomer (1.194 mmol, 79.4 μL) was then added by syringe and the reaction was allowed to run for 24h at 25° C. The resulting reaction mixture was dialyzed against DI water for 36h using a MWCO of 25,000 Da, and then lyophilized to isolate the BSA Glycidol Conjugate (BSA-GLY).

This reaction was repeated with the PB replaced with either DMF or DMSO in order to evaluate alternative reaction conditions. The products obtained from these three solvent systems were visibly different with a seeming decrease in solubility in the trend; PB>DMF>DMSO. However, apart from this caveat, the reaction procedure remained unchanged.

c. Sodium Dodecyl Sulfate-Polyacrylamide Gel Electrophoresis (Page)

PAGE was accomplished using an Invitrogen Novex Mini-Cell system. Precast 12% Precise™ Protein Gels (Thermo Scientific) were run at 100V and 120 mA for 1.75 hours. Solutions were prepared with a BSA concentration of 6 g/L in DI water. PAGE samples were formed by mixing 7.5 μL of BSA solution with 2.5 μL 4xLDS sample buffer (invitrogen) before loading the 104, solutions onto the gel plate. Staining of the gels was accomplished using coomassie blue.

d. Bioactivity Assay

The bioactivity of the synthesized BSA-OH conjugates and subsequent polymer coated species was determined and compared to the native BSA protein by measuring the absorbance related to the hydrolysis product with 4-nitrophenyl acetate as previously published by Sumerlin (*J. Am. Chem. Soc.*, 2008, 130, 11288. Sample preparation was performed by combining a BSA or BSA conjugate solution (50 μL, [BSA]=0.27 mM) in PB (pH=8.0) with a 10 mM solution of 4-nitrophenyl acetate dissolved in acetonitrile (10 μL) and PB (0.94 mL, pH=8.0) and centrifuging the samples for 5 minutes at 6,000 rpm. The samples were allowed to incubate for 30 minutes at room temperature before measuring the absorbance at λ=405 nm to determine the bioactivity of each sample.

4. Preparation of Monomers (1) Purification of M-CPBA m-CPBA (70 g; 77%) was dissolved in diethyl ether (500 mL) and transferred to a separatory funnel. The ether layer was then washed 3x with 300 mL aliquots of buffer solution (410 mL 0.1M NaOH, 250 mL 0.2M $KH_2PO_4$, made up to 1 L; pH≈7.5). The ether layer was dried over $MgSO_4$ and then evaporated on the rotovap to yield the pure white m-CPBA product (J. Chem. Soc., 1998. Perkin Trans 1: p. 2771). $^1$H-NMR (400 MHz, $CDCl_3$) δ: 8.14-8.08 (2H, m, CH, CH), 7.82 (1H, d, CH), 7.59 (1H, m, CH).

(2) Preparation of Diallyl Ester

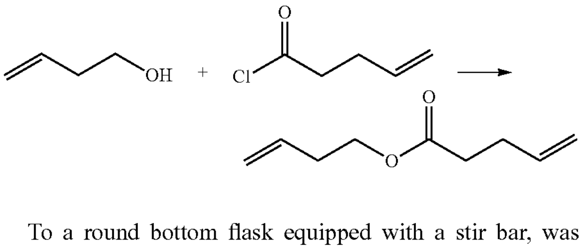

To a round bottom flask equipped with a stir bar, was added 3-butene-1-ol (3.27 g; 45.29 mmol; 1.0 eq) and DCM (25 mL; excess). A diluted solution of 4-pentenoyl chloride (5.37 g; 45.29 mmol; 1.0 eq) and DCM (25 mL; excess) was created in an addition funnel. The 4-pentenoyl chloride solution was then added drop wise to the stirring reaction mixture over 30 minutes and the reaction was allowed to run for 3h until TLC indicated the reaction was complete. The excess solvent was then removed on the rotovap to afford the crude product. The resulting crude liquid product was on the Biotage column system using a gradient of 8%-70% ethyl acetate in hexanes to yield the pure clear liquid product. Yield: 10.33 g (73.95%). $^1$H-NMR (500 MHz, $CDCl_3$/TMS) δ 5.78 (2H, m, CH), 5.07 (4H, m, $CH_2$), 4.12 (2H, t, $CH_2O$), 2.38 (6H, m, $3CH_2$). $^{13}$C-NMR (125 MHz, $CDCl_3$) δ 173.22, 136.89, 134.22, 117.38, 115.65, 63.61, 33.73, 33.28, 29.07.

(3) Preparation of Glycidyl Ester Allyl

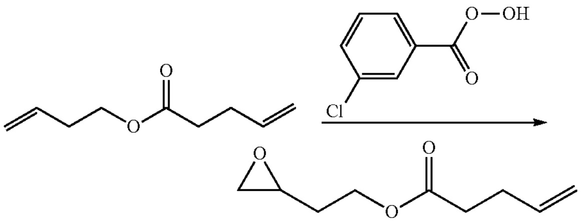

To a round bottom flask equipped with a stir bar, was added the previously synthesized diallyl ester (2.90 g; 18.79 mmol; 1.0 eq), m-CPBA (3.24 g; 18.79 mmol; 1.0 eq), and DCM (53.66 mL; $5.4\times10^{-2}$ g/mL). The oxidation reaction was then allowed to run for 48 h. The crude product was then vacuum filtered to remove the white precipitate before extracting the filtrate with saturated sodium bicarbonate to remove any unreacted m-CPBA. The excess DCM was then removed on the rotovap to afford the clear crude liquid product. The resulting crude liquid product was purified on the Biotage column system using a gradient of 8%-70% ethyl acetate in hexanes to yield the pure clear liquid product. Yield: 6.83 g (60.47%). $^1$H-NMR (500 MHz, $CDCl_3$) δ 5.82 (1H, m, CH), 5.09 (2H, m, $CH_2$), 4.41 (1H, dd, $CH_2$), 3.93 (1H, q, $CH_2$), 3.21 (1H, sext, CH), 2.85 (1H, t, $CH_2$), 2.65 (1H, q, $CH_2$), 2.47 (2H, m, $CH_2$), 2.40 (2H, m, $CH_2$). $^{13}$C-NMR (125 MHz, $CDCl_3$) δ 174.27, 138, 116.06, 66.23, 50.42, 45.13, 34.27, 29.96.

(4) Preparation of Mixed Length Diallyl Ester

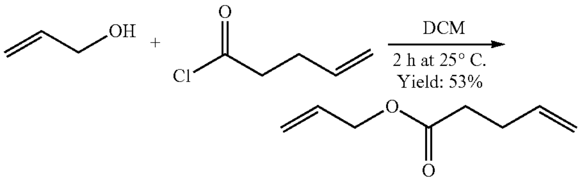

To a round bottom flask equipped with a stir bar, was added allyl alcohol (3.27 g; 45.29 mmol; 1.0 eq) and DCM (25 mL; excess). A diluted solution of 4-pentenoyl chloride (5.37 g; 45.29 mmol; 1.0 eq) and DCM (25 mL; excess) was created in an addition funnel. The 4-pentenoyl chloride solution was then added drop wise to the stirring reaction mixture over 30 minutes and the reaction was allowed to run for 3 h until TLC indicated the reaction was complete. The excess solvent was then removed on the rotovap to afford the crude product. The resulting crude liquid product was purified on the Biotage column system using a gradient of 8%-70% ethyl acetate in hexanes to yield the pure clear liquid product. $^1$H-NMR (500 MHz, $CDCl_3$/TMS) δ 5.78 (2H, m, CH), 5.09 (4.11H, m, $CH_2$), 4.12 (2H, t, $CH_2O$), 2.39 (6.4H, m, $3CH_2$).

(5) Preparation of Mixed Length Glycidyl Ester Allyl

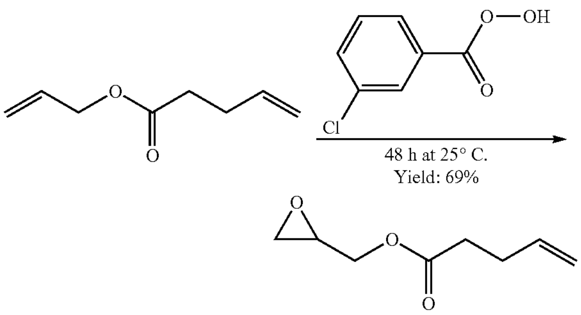

To a round bottom flask equipped with a stir bar, was added the previously synthesized mixed length diallyl ester (2.90 g; 18.79 mmol; 1.0 eq), m-CPBA (3.24 g; 18.789 mmol; 1.0 eq), and DCM (53.657 mL; $5.4\times10^{-2}$ g/mL). The oxidation reaction was then allowed to run for 48 h. The crude product was then vacuum filtered to remove the white precipitate before extracting the filtrate with saturated sodium bicarbonate to remove any unreacted m-CPBA. The excess DCM was then removed on the rotovap to afford the clear crude liquid product. The resulting crude liquid product was purified on the Biotage column system using a gradient of 8%-70% ethyl acetate in hexanes to yield the pure clear liquid product. $^1$H-NMR (500 MHz, $CDCl_3$) δ 5.88 (2H, m, CH), 5.22 (4.54H, m, $CH_2$), 2.95 (2.19H, m), 2.72 (2.58H, t), 1.94 (3.06H, m), 1.75, 2.87H).

5. Preparation of Crosslinkers (1) Preparation of Disulfide Linker

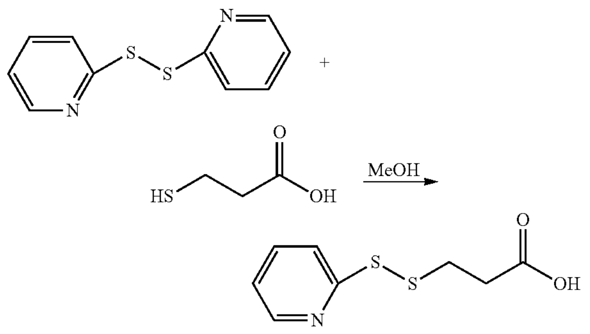

To a round bottom flask equipped with a stir bar, was added aldrithiol-2 (10.00 g; 1.5 eq), 3-mercaptopropionic acid (3.212 g; 1.0 eq), and MeOH (excess). The yellow reaction was then allowed to stir for 72 h. The resulting yellow solution was concentrated and the yellow product was resuspended in dichloromethane and dried onto silica gel. The product was then purified through column chromatography using a gradient of 10%-30% ethyl acetate in hexanes to yield the pure, slightly off-white solid product. Yield: 2.23 g (34.17%). $^1$H-NMR (400 MHz, $CDCl_3$) δ: 8.39 (1H), 7.81 (2H), 7.22 (1H), 3.03 (2H), 2.71 (2H). $^{13}$C-NMR (100 MHz, $CDCl_3$) δ: 175.56, 159.39, 149.60, 137.64, 121.46, 120.85, 34.37, 34.24.

(2) Preparation of Disulfide Amine Crosslinker

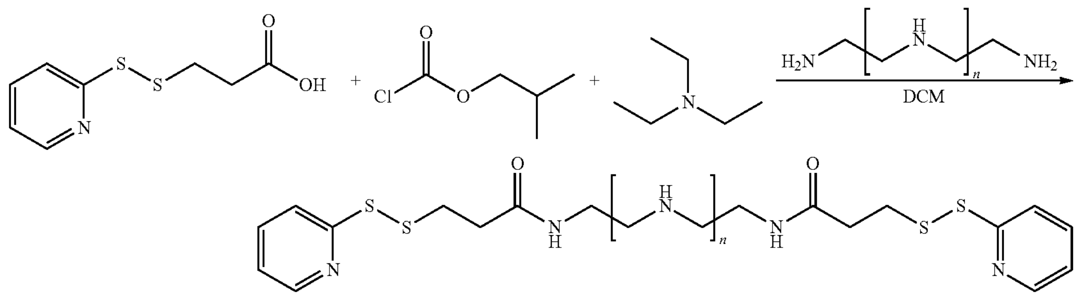

To a round bottom flask equipped with a stir bar, in an ice bath, was added the previously synthesized disulfide linker (0.50 g; 2.32 mmol; 6.0 eq), THF (excess), and triethylamine (0.33 g; 3.25 mmol; 8.4 eq), followed by the slow addition of isobutyl chloroformate (0.40 g; 2.90 mmol; 7.5 eq). The reaction was then allowed to stir for 3 hours. To the stirring reaction mixture was then added pentaethylenhexamine (0.09 g; 0.39 mmol; 1.0 eq) slowly drop wise. The reaction was then removed from the ice bath and allowed to run for an additional 24 hours at room temperature. The excess solvent was then removed on the rotovap to afford the crude, deep red product. The resulting crude product was purified on the Biotage column system using a gradient of 2%-20% ethyl acetate in hexanes to yield the pure, slightly off-white solid product. $^1$H-NMR (400 MHz, $CDCl_3$) δ: 8.42 (2H), 7.48 (2H), 7.18 (2.01H), 6.98 (2.15H) 3.90 (4.56H), 3.45 (4.17H), 3.34 (1.16H), 2.89 (1.06H), 2.80 (4.35), 1.13 (0.96H), 0.94 (15.11H). $^{13}$C-NMR (100 MHz, $CDCl_3$) δ: 172.33, 158.41, 149.57, 136.17, 122.62, 119.65, 53.61, 42.93, 34.93, 27.88, 25.18, 19.27.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer comprising repeating units selected from

A1

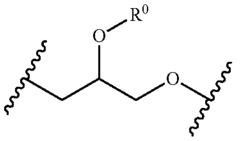

and

A2

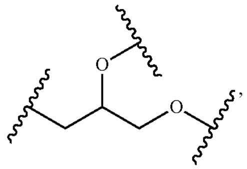

, and repeating units selected from

B1

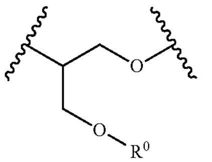

and

B2

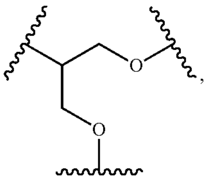

, wherein $R^0$ is selected from H, alkyl, $NH_2$, and $R^1$;

wherein $R^1$ comprises a crosslinking functionality;

wherein repeating units A1, A2, B1, and B2 account for at least about 50 wgt % of the polymer;

wherein the ratio of (A1+A2):(B1+B2) is greater than 1; and wherein the polymer does not comprise a

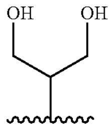 [SMILES: *C(CO)CO]

moiety; and wherein the polymer is crosslinked.

2. The polymer of claim 1, wherein the polymer comprises 0 wgt % of a repeating unit formed from tetrahydrofuran.

3. The polymer of claim 1, wherein the ratio of (A1+A2):(B1+B2) is from about 1.5 to about 10.0.

4. A polymer comprising repeating units selected from

A1

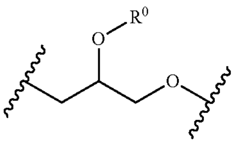

and

A2

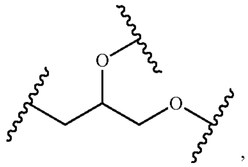

, and repeating units selected from

B1

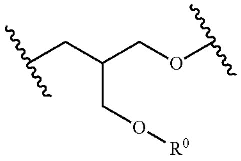

and

B2

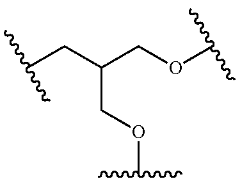

, wherein $R^0$ is selected from H, alkyl, $NH_2$, and $R^1$;

wherein $R^1$ comprises a crosslinking functionality;

wherein repeating units A1, A2, B1, and B2 account for at least about 50 wgt % of the polymer;

wherein the ratio of (A1+A2):(B1+B2) is greater than 1; and wherein the polymer does not comprise a

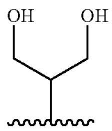

moiety; and wherein repeating units A1, A2, B1 and B2 account for at least about 100 wgt% of the polymer.

5. The polymer of claim 1, wherein the polymer further comprises at least one repeating unit formed from a monomer selected from:

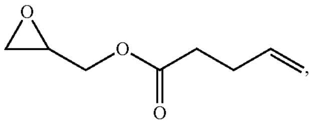

,

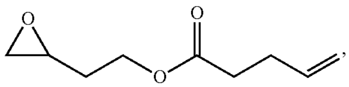

,

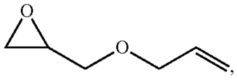

, and

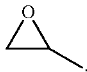

, or a combination thereof.

6. The polymer of claim 1, wherein the polymer has a weight average molecular weight from about 0.3 kDa to about 40 kDa.

7. A polymer comprising repeating units selected from

A1

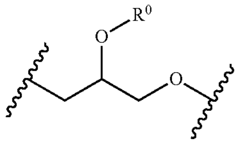

and

A2

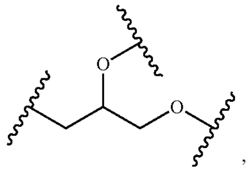

, and repeating units selected from

B1

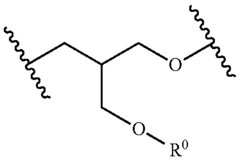

and

-continued

B2

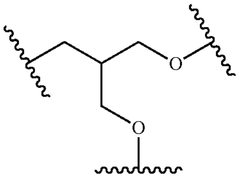

, wherein $R^0$ is selected from H, alkyl, $NH_2$, and $R^1$;
wherein $R^1$ comprises a crosslinking functionality;
wherein repeating units A1, A2, B1, and B2 account for at least about 50 wgt % of the polymer;
wherein the ratio of (A1+A2):(B1+B2) is greater than 1; and
wherein the polymer does not comprise a

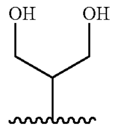 [SMILES: *C(CO)CO]

moiety; and
wherein the polymer does not comprise a unit or repeating unit formed from diglycidyl ether.

8. A polymer comprising repeating units selected from

A1

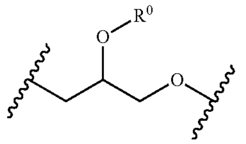

and

A2

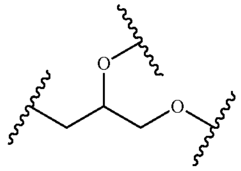

, and repeating units selected from

B1

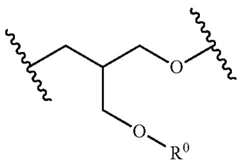

and

B2

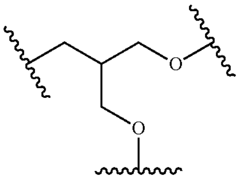

, wherein $R^0$ is selected from H, alkyl, $NH_2$, and $R^1$;
wherein $R^1$ comprises a crosslinking functionality;

wherein repeating units A1, A2, B1, and B2 account for at least about 50 wgt % of the polymer;

wherein the ratio of (A1+A2):(B1+B2) is greater than 1; and wherein the polymer does not comprise a

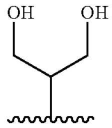

moiety, and wherein the polymer does not comprise an initiator other than glycidol.

9. The polymer of claim 1, wherein the polymer does not comprise a metal catalyst residue.

10. The polymer of claim 9, wherein the metal catalyst residue is a tin catalyst residue.

11. The polymer of claim 1, wherein the degree of branching is between 0.15 and 0.30.

12. The polymer of claim 1, wherein the degree of branching is between 0.20 and 0.30.

13. The polymer of claim 1, wherein the polymer is further conjugated to a protein.

14. The polymer of claim 13, wherein the protein is albumin.

15. The polymer of claim 1, wherein the polymer includes crosslinkers that comprise

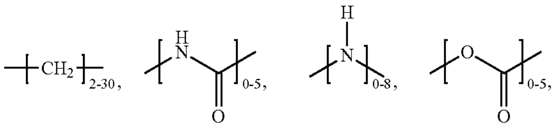

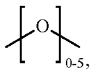 and 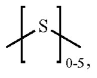

wherein at least one of

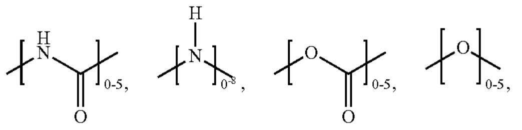

and 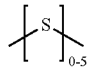

is not 0.

16. The polymer of claim 1, wherein the polymer comprises

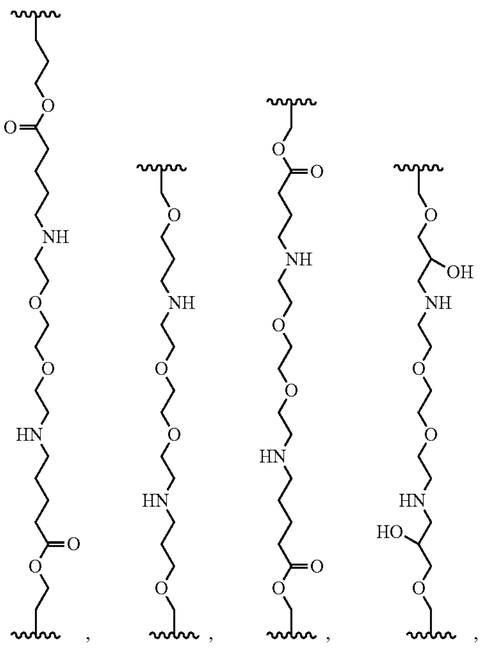 [SMILES: *CCCOC(=O)CCCCNCCOCCOCCNCCCCC(=O)OCC* ; *COCCCNCCOCCOCCNCCCOC* ; *COC(=O)CCCCNCCOCCOCCNCCCC(=O)OC* ; *COCC(O)CNCCOCCOCCNCC(O)COC*]

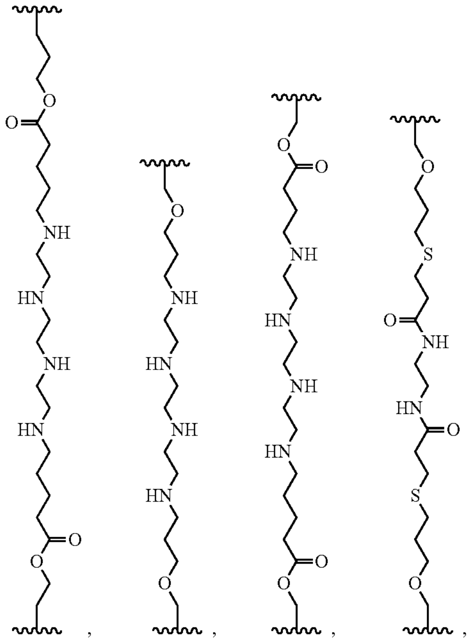 [SMILES: *CCCOC(=O)CCCCNCCNCCNCCNCCCCC(=O)OCC* ; *COCCCNCCNCCNCCNCCCOC* ; *COC(=O)CCCCNCCNCCNCCNCCCC(=O)OC* ; *COCCCSCCC(=O)NCCNC(=O)CCSCCCOC*]

-continued
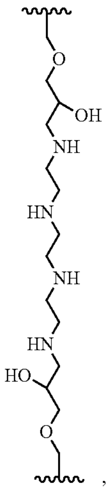
,
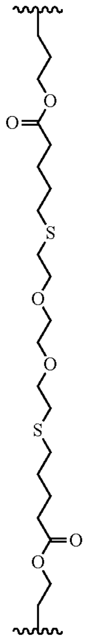
,
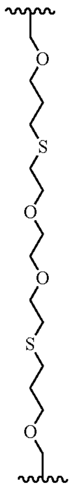
,
-continued
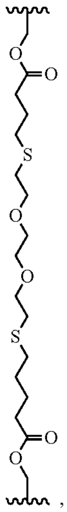
,
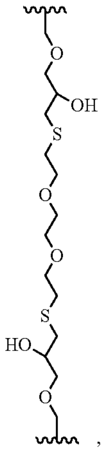
, or
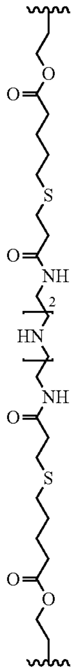
.
17. A pharmaceutical composition comprising a polymer of claim 1 and a pharmaceutically acceptable carrier.
18. The pharmaceutical composition of claim 17, wherein the pharmaceutical composition further comprises a pharmaceutically active agent or a biologically active agent.
19. A nanoparticle comprising a polymer of claim 1.
* * * * *

UNITED STATES PATENT AND TRADEMARK OFFICE

CERTIFICATE OF CORRECTION

PATENT NO. : 10,308,763 B2
APPLICATION NO. : 15/684638
DATED : June 4, 2019
INVENTOR(S) : Eva M. Harth and Benjamin R. Spears It is certified that error appears in the above-identified patent and that said Letters Patent is hereby corrected as shown below:

In the Specification

In Column 1, after Line 12, add the following paragraph:
-- STATEMENT REGARDING FEDERALLY SPONSORED RESEARCH
This invention was made with government support under grant number EB009223 awarded by the National Institutes of Health. The government has certain rights in the invention. --

Signed and Sealed this
Nineteenth Day of November, 2019

Andrei Iancu
*Director of the United States Patent and Trademark Office*